United States Patent
Hirtenstein et al.

(10) Patent No.: US 10,380,654 B2
(45) Date of Patent: Aug. 13, 2019

(54) SYSTEM AND METHOD FOR PROVIDING A SCORE FOR A USED VEHICLE

(71) Applicant: Experian Information Solutions, Inc., Costa Mesa, CA (US)

(72) Inventors: Edith Hirtenstein, Chicago, IL (US); David Nemtuda, Algonquin, IL (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

(21) Appl. No.: 13/758,641

(22) Filed: Feb. 4, 2013

(65) Prior Publication Data
US 2013/0173481 A1     Jul. 4, 2013

Related U.S. Application Data

(63) Continuation of application No. 13/214,877, filed on Aug. 22, 2011, now Pat. No. 8,392,334, which is a
(Continued)

(51) Int. Cl.
*G06Q 30/06*     (2012.01)
*G06Q 30/02*     (2012.01)

(52) U.S. Cl.
CPC ..... *G06Q 30/0278* (2013.01); *G06Q 30/0283* (2013.01); *G06Q 30/0603* (2013.01)

(58) Field of Classification Search
CPC ............. G06Q 30/0283; G06Q 10/087; G06Q 10/067; G06Q 30/0278
(Continued)

(56) References Cited

U.S. PATENT DOCUMENTS 4,775,935 A    10/1988   Yourick
4,827,508 A    5/1989   Shear
(Continued)

FOREIGN PATENT DOCUMENTS

EP    0 749 081    12/1996
EP    1 077 419    2/2001
(Continued)

OTHER PUBLICATIONS

"Consumer Reports Finds American-Made Vehicles Close Reliability Gap With European-Made Vehicles—As Japanese Continue to Set New Benchmarks for the Industry", Apr. 2003, 2 pages (Year: 2003).*
(Continued)

*Primary Examiner* — Shannon S Campbell
*Assistant Examiner* — Freda A Nelson
(74) *Attorney, Agent, or Firm* — Knobbe, Martens, Olson & Bear, LLP

(57) ABSTRACT

One embodiment of the system and method described herein provides a score generator system that generates an automated vehicle specific valuation of a used car based on the physical and historical attributes of that vehicle. This score may indicate the likelihood that the vehicle will be on the road in a specific period of time. The score may give an absolute percentage of such likelihood or it may give a value relative to all other used vehicles in a database, all other used vehicles of the same make/model/year, or a certain subset of the vehicles in a database. In one embodiment, the score generator system includes a data link module for linking vehicle data and filter module for applying a multi-level filters that process the linked vehicle data.

18 Claims, 7 Drawing Sheets

Related U.S. Application Data continuation of application No. 11/893,609, filed on Aug. 16, 2007, now Pat. No. 8,005,759.

(60) Provisional application No. 60/838,468, filed on Aug. 17, 2006, provisional application No. 60/888,021, filed on Feb. 2, 2007, provisional application No. 60/949,808, filed on Jul. 13, 2007.

(58) Field of Classification Search
USPC ...... 705/26.61, 35, 400, 26.1, 306; 701/29.6
See application file for complete search history.

(56) References Cited

U.S. PATENT DOCUMENTS

| | | |
|---|---|---|
| 4,868,570 A | 9/1989 | Davis |
| 4,872,113 A | 10/1989 | Dinerstein |
| 4,935,870 A | 6/1990 | Burk, Jr. et al. |
| 4,989,144 A | 1/1991 | Barnett, III |
| 5,056,019 A | 10/1991 | Schultz et al. |
| 5,120,704 A | 6/1992 | Lechter et al. |
| 5,201,010 A | 4/1993 | Deaton et al. |
| 5,216,612 A | 6/1993 | Cornett et al. |
| 5,247,575 A | 9/1993 | Sprague et al. |
| 5,325,509 A | 6/1994 | Lautzenheiser |
| 5,341,429 A | 8/1994 | Stringer et al. |
| 5,528,701 A | 6/1996 | Aref |
| 5,532,838 A | 7/1996 | Barbari |
| 5,555,409 A | 9/1996 | Leenstra, Sr. et al. |
| 5,590,038 A | 12/1996 | Pitroda |
| 5,592,560 A | 1/1997 | Deaton et al. |
| 5,630,070 A | 5/1997 | Dietrich et al. |
| 5,640,551 A | 6/1997 | Chu et al. |
| 5,640,577 A | 6/1997 | Scharmer |
| 5,655,129 A | 8/1997 | Ito |
| 5,659,731 A | 8/1997 | Gustafson |
| 5,666,528 A | 9/1997 | Thai |
| 5,692,107 A | 11/1997 | Simoudis et al. |
| 5,737,732 A | 4/1998 | Gibson et al. |
| 5,748,098 A | 5/1998 | Grace |
| 5,754,938 A | 5/1998 | Herz et al. |
| 5,765,143 A | 6/1998 | Sheldon et al. |
| 5,768,423 A | 6/1998 | Aref et al. |
| 5,774,692 A | 6/1998 | Boyer et al. |
| 5,778,405 A | 7/1998 | Ogawa |
| 5,797,136 A | 8/1998 | Boyer et al. |
| 5,812,840 A | 9/1998 | Shwartz |
| 5,819,234 A | 10/1998 | Slavin et al. |
| 5,822,410 A | 10/1998 | McCausland et al. |
| 5,822,750 A | 10/1998 | Jou et al. |
| 5,822,751 A | 10/1998 | Gray et al. |
| 5,825,884 A | 10/1998 | Zdepski et al. |
| 5,832,068 A | 11/1998 | Smith |
| 5,835,915 A | 11/1998 | Carr et al. |
| 5,844,218 A | 12/1998 | Kawan et al. |
| 5,878,403 A | 3/1999 | DeFrancesco |
| 5,881,131 A | 3/1999 | Farris et al. |
| 5,884,287 A | 3/1999 | Edesess |
| 5,905,985 A | 5/1999 | Malloy et al. |
| 5,926,800 A | 7/1999 | Baronowski et al. |
| 5,940,812 A | 8/1999 | Tengel et al. |
| 5,956,693 A | 9/1999 | Geerlings |
| 5,963,932 A | 10/1999 | Jakobsson et al. |
| 5,974,396 A | 10/1999 | Anderson et al. |
| 5,995,947 A | 11/1999 | Fraser et al. |
| 6,009,415 A | 12/1999 | Shurling et al. |
| 6,018,723 A | 1/2000 | Siegel et al. |
| 6,038,551 A | 3/2000 | Barlow et al. |
| 6,044,357 A | 3/2000 | Garg |
| 6,064,990 A | 5/2000 | Goldsmith |
| 6,070,147 A | 5/2000 | Harms et al. |
| 6,073,140 A | 6/2000 | Morgan et al. |
| 6,121,901 A | 9/2000 | Welch et al. |
| 6,126,332 A | 10/2000 | Cubbage et al. |
| 6,128,602 A | 10/2000 | Northington et al. |
| 6,128,624 A | 10/2000 | Papierniak et al. |
| 6,144,957 A | 11/2000 | Cohen et al. |
| 6,151,601 A | 11/2000 | Papierniak et al. |
| 6,157,927 A | 12/2000 | Schaefer et al. |
| 6,182,048 B1 | 1/2001 | Osborn et al. |
| 6,182,060 B1 | 1/2001 | Hedgcock et al. |
| 6,202,053 B1 | 3/2001 | Christiansen et al. |
| 6,208,979 B1 | 3/2001 | Sinclair |
| 6,223,171 B1 | 4/2001 | Chaudhuri et al. |
| 6,236,977 B1 | 5/2001 | Verba |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,278,936 B1 | 8/2001 | Jones |
| 6,282,517 B1 | 8/2001 | Wolfe et al. |
| 6,304,869 B1 | 10/2001 | Moore et al. |
| 6,330,499 B1 | 12/2001 | Chou et al. |
| 6,334,110 B1 | 12/2001 | Walter et al. |
| 6,339,769 B1 | 1/2002 | Cochrane et al. |
| 6,366,903 B1 | 4/2002 | Agrawal et al. |
| 6,405,173 B1 | 6/2002 | Honarvar |
| 6,446,200 B1 | 9/2002 | Ball et al. |
| 6,456,979 B1 | 9/2002 | Flagg |
| 6,457,012 B1 | 9/2002 | Jatkowski |
| 6,460,036 B1 | 10/2002 | Herz |
| 6,496,819 B1 | 12/2002 | Bello et al. |
| 6,513,018 B1 | 1/2003 | Culhane |
| 6,523,022 B1 | 2/2003 | Hobbs |
| 6,523,041 B1 | 2/2003 | Morgan et al. |
| 6,574,623 B1 | 6/2003 | Laung et al. |
| 6,587,841 B1 | 7/2003 | DeFrancesco |
| 6,598,030 B1 | 7/2003 | Siegel et al. |
| 6,631,496 B1 | 10/2003 | Li et al. |
| 6,651,220 B1 | 11/2003 | Penteroudakis et al. |
| 6,658,393 B1 | 12/2003 | Basch et al. |
| 6,714,859 B2 | 3/2004 | Jones |
| 6,738,748 B2 | 5/2004 | Wetzer |
| 6,748,426 B1 | 6/2004 | Shaffer et al. |
| 6,766,327 B2 | 7/2004 | Morgan, Jr. et al. |
| 6,772,145 B2 | 8/2004 | Shishido |
| 6,801,909 B2 | 10/2004 | Delgado et al. |
| 6,804,346 B1 | 10/2004 | Mewhinney |
| 6,804,606 B2 | 10/2004 | Jones |
| 6,804,701 B2 | 10/2004 | Muret et al. |
| 6,904,359 B2 | 6/2005 | Jones |
| 6,910,624 B1 | 6/2005 | Natsuno |
| 6,934,714 B2 | 8/2005 | Meinig |
| 6,954,757 B2 | 10/2005 | Zargham et al. |
| 6,959,281 B1 | 10/2005 | Freeling et al. |
| 6,983,379 B1 | 1/2006 | Spalink et al. |
| 6,983,478 B1 | 1/2006 | Grauch et al. |
| 6,985,887 B1 | 1/2006 | Sunstein et al. |
| 7,003,504 B1 | 2/2006 | Angus et al. |
| 7,003,792 B1 | 2/2006 | Yuen |
| 7,024,418 B1 | 4/2006 | Childress |
| 7,028,001 B1 | 4/2006 | Muthuswamy et al. |
| 7,028,052 B2 | 4/2006 | Chapman et al. |
| 7,035,855 B1 | 4/2006 | Kilger et al. |
| 7,039,607 B2 | 5/2006 | Watarai et al. |
| 7,047,251 B2 | 5/2006 | Reed et al. |
| 7,050,982 B2 | 5/2006 | Sheinson et al. |
| 7,050,989 B1 | 5/2006 | Hurt et al. |
| 7,076,475 B2 | 7/2006 | Honarvar |
| 7,082,435 B1 | 7/2006 | Guzman et al. |
| 7,092,898 B1 | 8/2006 | Mattick et al. |
| 7,113,853 B2 | 9/2006 | Hecklinger |
| 7,133,935 B2 | 11/2006 | Hedy |
| 7,136,448 B1 | 11/2006 | Venkataperumal et al. |
| 7,167,907 B2 | 1/2007 | Shaffer et al. |
| 7,181,427 B1 | 2/2007 | DeFrancesco |
| 7,184,974 B2 | 2/2007 | Shishido |
| 7,185,016 B1 | 2/2007 | Rasmussen |
| 7,191,058 B2 | 3/2007 | Laird et al. |
| 7,200,602 B2 | 4/2007 | Jonas |
| 7,228,298 B1 | 6/2007 | Raines |
| 7,288,298 B2 | 6/2007 | Raines |
| 7,240,059 B2 | 7/2007 | Bayliss et al. |
| 7,249,048 B1 | 7/2007 | O'Flaherty |
| 7,272,591 B1 | 9/2007 | Ghazal et al. |

(56) References Cited

U.S. PATENT DOCUMENTS

| | | |
|---|---|---|
| 7,275,083 B1 | 9/2007 | Seibel et al. |
| 7,277,900 B1 | 10/2007 | Ganesh et al. |
| 7,296,734 B2 | 11/2007 | Pliha |
| 7,366,694 B2 | 4/2008 | Lazerson |
| 7,367,011 B2 | 4/2008 | Ramsey et al. |
| 7,370,044 B2 | 5/2008 | Mulhern et al. |
| 7,376,603 B1 | 5/2008 | Mayr et al. |
| 7,383,215 B1 | 6/2008 | Navarro et al. |
| 7,383,227 B2 | 6/2008 | Weinflash et al. |
| 7,392,203 B2 | 6/2008 | Edison et al. |
| 7,392,221 B2 | 6/2008 | Nabe et al. |
| 7,403,942 B1 | 7/2008 | Bayliss |
| 7,421,322 B1 * | 9/2008 | Silversmith .......... G06Q 10/087 701/29.6 |
| 7,433,864 B2 | 10/2008 | Malik |
| 7,444,302 B2 | 10/2008 | Hu et al. |
| 7,451,113 B1 | 11/2008 | Kasower |
| 7,467,127 B1 | 12/2008 | Baccash et al. |
| 7,472,088 B2 | 12/2008 | Taylor et al. |
| RE40,692 E | 3/2009 | Rose, Jr. |
| 7,505,838 B2 | 3/2009 | Raines et al. |
| 7,529,698 B2 | 5/2009 | Joao |
| 7,533,179 B2 | 5/2009 | Tarquini et al. |
| 7,536,346 B2 | 5/2009 | Aliffi et al. |
| 7,571,139 B1 | 8/2009 | Giordano et al. |
| 7,580,856 B1 | 8/2009 | Pliha |
| 7,590,589 B2 | 9/2009 | Hoffberg |
| 7,593,893 B1 | 9/2009 | Ladd et al. |
| 7,596,512 B1 * | 9/2009 | Raines et al. ............... 705/26.61 |
| 7,596,716 B2 | 9/2009 | Frost et al. |
| 7,610,257 B1 | 10/2009 | Abrahams |
| 7,653,592 B1 | 1/2010 | Flaxman et al. |
| 7,653,593 B2 | 1/2010 | Zarikian et al. |
| 7,668,840 B2 | 2/2010 | Bayliss et al. |
| 7,672,833 B2 | 3/2010 | Blume et al. |
| 7,672,865 B2 | 3/2010 | Kumar et al. |
| 7,672,924 B1 | 3/2010 | Scheurich et al. |
| 7,672,926 B2 | 3/2010 | Ghazal et al. |
| 7,689,505 B2 | 3/2010 | Kasower |
| 7,693,896 B1 | 4/2010 | Raines |
| 7,698,163 B2 | 4/2010 | Reed et al. |
| 7,707,059 B2 | 4/2010 | Reed et al. |
| 7,725,300 B2 | 5/2010 | Pinto et al. |
| 7,742,982 B2 | 6/2010 | Chaudhuri et al. |
| 7,747,480 B1 | 6/2010 | Agresta et al. |
| 7,747,559 B2 | 6/2010 | Leitner et al. |
| 7,752,236 B2 | 7/2010 | Williams et al. |
| 7,756,789 B2 | 7/2010 | Welker et al. |
| 7,778,841 B1 | 8/2010 | Bayer et al. |
| 7,788,147 B2 | 8/2010 | Haggerty et al. |
| 7,797,252 B2 | 9/2010 | Rosskamm et al. |
| 7,801,812 B2 | 9/2010 | Conlin et al. |
| 7,814,005 B2 | 10/2010 | Imrey et al. |
| 7,818,228 B1 | 10/2010 | Coulter |
| 7,849,004 B2 | 12/2010 | Choudhuri et al. |
| 7,860,786 B2 | 12/2010 | Blackburn et al. |
| 7,865,409 B1 | 1/2011 | Monaghan |
| 7,877,320 B1 | 1/2011 | Downey |
| 7,925,654 B1 | 4/2011 | Raines |
| 7,930,242 B2 | 4/2011 | Morris et al. |
| 7,945,478 B2 | 5/2011 | Hogan et al. |
| 7,954,698 B1 | 6/2011 | Pliha |
| 7,962,404 B1 | 6/2011 | Metzger, II et al. |
| 7,966,210 B2 | 6/2011 | Hall et al. |
| 7,974,860 B1 | 7/2011 | Travis |
| 7,983,932 B2 | 7/2011 | Kane |
| 7,991,666 B2 | 8/2011 | Haggerty et al. |
| 7,991,689 B1 | 8/2011 | Brunzell et al. |
| 7,991,901 B2 | 8/2011 | Tarquini et al. |
| 7,996,912 B2 | 8/2011 | Spalink et al. |
| 8,001,042 B1 | 8/2011 | Brunzell et al. |
| 8,005,759 B2 | 8/2011 | Hirtenstein et al. |
| 8,005,795 B2 | 8/2011 | Galipeau et al. |
| 8,024,264 B2 | 9/2011 | Chaudhuri et al. |
| 8,036,979 B1 | 10/2011 | Torrez et al. |
| 8,065,233 B2 | 11/2011 | Lee et al. |
| 8,078,524 B2 | 12/2011 | Crawford et al. |
| 8,078,528 B1 | 12/2011 | Vicente et al. |
| 8,086,524 B1 | 12/2011 | Craig et al. |
| 8,095,443 B2 | 1/2012 | DeBie |
| 8,099,341 B2 | 1/2012 | Varghese |
| 8,099,356 B2 | 1/2012 | Feinstein et al. |
| 8,104,671 B2 | 1/2012 | Besecker et al. |
| 8,126,805 B2 | 2/2012 | Sulkowski et al. |
| 8,127,986 B1 | 3/2012 | Taylor et al. |
| 8,135,642 B1 | 3/2012 | Krause |
| 8,219,464 B2 | 7/2012 | Inghelbrecht et al. |
| 8,234,498 B2 | 7/2012 | Britti et al. |
| 8,239,388 B2 | 8/2012 | Raines |
| 8,255,243 B2 | 8/2012 | Raines et al. |
| 8,255,244 B2 | 8/2012 | Raines et al. |
| 8,271,378 B2 | 9/2012 | Chaudhuri et al. |
| 8,280,805 B1 | 10/2012 | Abrahams et al. |
| 8,285,656 B1 | 10/2012 | Chang et al. |
| 8,290,840 B2 | 10/2012 | Kasower |
| 8,296,229 B1 | 10/2012 | Yellin et al. |
| 8,301,574 B2 | 10/2012 | Kilger et al. |
| 8,312,033 B1 | 11/2012 | McMillan |
| 8,315,943 B2 | 11/2012 | Torrez et al. |
| 8,321,952 B2 | 11/2012 | Spalink et al. |
| 8,355,983 B1 | 1/2013 | Parr et al. |
| 8,364,518 B1 | 1/2013 | Blake et al. |
| 8,364,588 B2 | 1/2013 | Celka et al. |
| 8,392,334 B2 | 3/2013 | Hirtenstein et al. |
| 8,463,919 B2 | 6/2013 | Tarquini et al. |
| 8,478,674 B1 | 7/2013 | Kapczynski et al. |
| 8,515,828 B1 | 8/2013 | Wolf et al. |
| 8,560,161 B1 | 10/2013 | Kator et al. |
| 8,595,079 B1 | 11/2013 | Raines et al. |
| 8,600,823 B1 | 12/2013 | Raines et al. |
| 8,606,648 B1 | 12/2013 | Bayer et al. |
| 8,606,666 B1 | 12/2013 | Courbage et al. |
| 8,626,560 B1 | 1/2014 | Anderson |
| 8,630,929 B2 | 1/2014 | Haggerty et al. |
| 8,639,616 B1 | 1/2014 | Rolenaitis et al. |
| 8,639,920 B2 | 1/2014 | Stack et al. |
| 8,725,584 B1 | 5/2014 | Eager et al. |
| 9,053,589 B1 | 6/2015 | Kator et al. |
| 9,053,590 B1 | 6/2015 | Kator et al. |
| 9,076,276 B1 | 7/2015 | Kator et al. |
| 9,147,217 B1 | 9/2015 | Zabritski et al. |
| 9,646,308 B1 | 5/2017 | Eager et al. |
| 9,697,544 B1 | 7/2017 | Bayer et al. |
| 9,741,066 B2 | 8/2017 | Eager et al. |
| 10,162,848 B2 | 12/2018 | Mohan et al. |
| 2001/0011245 A1 | 8/2001 | Duhon |
| 2001/0037332 A1 | 11/2001 | Miller et al. |
| 2001/0049620 A1 | 12/2001 | Blasko |
| 2002/0023051 A1 | 2/2002 | Kunzle et al. |
| 2002/0026507 A1 | 2/2002 | Sears et al. |
| 2002/0042752 A1 | 4/2002 | Chaves |
| 2002/0069122 A1 | 6/2002 | Yun et al. |
| 2002/0072964 A1 | 6/2002 | Choi |
| 2002/0077964 A1 | 6/2002 | Brody et al. |
| 2002/0082978 A1 | 6/2002 | Ghouri et al. |
| 2002/0091706 A1 | 7/2002 | Anderson et al. |
| 2002/0099628 A1 | 7/2002 | Yakaoka et al. |
| 2002/0099824 A1 | 7/2002 | Bender et al. |
| 2002/0103809 A1 | 8/2002 | Starzl et al. |
| 2002/0128960 A1 | 9/2002 | Lambiotte et al. |
| 2002/0128962 A1 | 9/2002 | Kasower |
| 2002/0133504 A1 | 9/2002 | Vlahos et al. |
| 2002/0138297 A1 | 9/2002 | Lee |
| 2002/0156676 A1 | 10/2002 | Ahrens et al. |
| 2002/0161496 A1 | 10/2002 | Yamaki |
| 2002/0161664 A1 | 10/2002 | Shaya et al. |
| 2002/0169747 A1 | 11/2002 | Chapman et al. |
| 2002/0173984 A1 | 11/2002 | Robertson et al. |
| 2002/0184255 A1 | 12/2002 | Edd et al. |
| 2002/0188544 A1 | 12/2002 | Wizon et al. |
| 2002/0194103 A1 | 12/2002 | Nabe |
| 2002/0198824 A1 | 12/2002 | Cook |
| 2003/0009418 A1 | 1/2003 | Green et al. |
| 2003/0018549 A1 | 1/2003 | Fei et al. |

(56) References Cited

U.S. PATENT DOCUMENTS

| | | |
|---|---|---|
| 2003/0018578 A1 | 1/2003 | Schultz |
| 2003/0033242 A1 | 2/2003 | Lynch et al. |
| 2003/0041019 A1 | 2/2003 | Vagim, III et al. |
| 2003/0046179 A1 | 3/2003 | Anabtawi et al. |
| 2003/0069839 A1 | 4/2003 | Whittington et al. |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0101344 A1 | 5/2003 | Wheeler et al. |
| 2003/0105728 A1* | 6/2003 | Yano ............ G06Q 10/06 705/400 |
| 2003/0144950 A1 | 7/2003 | O'Brien et al. |
| 2003/0171942 A1 | 9/2003 | Gaito |
| 2003/0177481 A1 | 9/2003 | Amaru et al. |
| 2003/0200151 A1 | 10/2003 | Ellenson et al. |
| 2003/0212654 A1 | 11/2003 | Harper et al. |
| 2003/0216965 A1 | 11/2003 | Libman |
| 2003/0219709 A1 | 11/2003 | Olenick et al. |
| 2003/0229892 A1 | 12/2003 | Sardera |
| 2003/0233278 A1 | 12/2003 | Marshall |
| 2003/0233323 A1 | 12/2003 | Bilski et al. |
| 2004/0010458 A1 | 1/2004 | Friedman |
| 2004/0030649 A1 | 2/2004 | Nelson et al. |
| 2004/0034657 A1 | 2/2004 | Zambo et al. |
| 2004/0039688 A1 | 2/2004 | Sulkowski et al. |
| 2004/0098625 A1 | 5/2004 | Lagadec et al. |
| 2004/0107125 A1 | 6/2004 | Guheen et al. |
| 2004/0111359 A1 | 6/2004 | Hudock |
| 2004/0117358 A1 | 6/2004 | Von Kaenel et al. |
| 2004/0122735 A1 | 6/2004 | Meshkin |
| 2004/0128150 A1 | 7/2004 | Lundegren |
| 2004/0128230 A1 | 7/2004 | Oppenheimer et al. |
| 2004/0128236 A1 | 7/2004 | Brown et al. |
| 2004/0153330 A1 | 8/2004 | Miller et al. |
| 2004/0153448 A1 | 8/2004 | Cheng et al. |
| 2004/0163101 A1 | 8/2004 | Swix |
| 2004/0199456 A1 | 10/2004 | Flint et al. |
| 2004/0199789 A1 | 10/2004 | Shaw et al. |
| 2004/0205157 A1 | 10/2004 | Bibelnieks et al. |
| 2004/0220896 A1 | 11/2004 | Finlay et al. |
| 2004/0225594 A1 | 11/2004 | Nolan, III et al. |
| 2004/0225596 A1 | 11/2004 | Kemper et al. |
| 2004/0243506 A1 | 12/2004 | Das |
| 2004/0243588 A1 | 12/2004 | Tanner et al. |
| 2004/0249532 A1 | 12/2004 | Kelly et al. |
| 2005/0004805 A1 | 1/2005 | Srinivasan |
| 2005/0010555 A1 | 1/2005 | Gallivan |
| 2005/0027633 A1 | 2/2005 | Fortuna et al. |
| 2005/0038580 A1 | 2/2005 | Seim et al. |
| 2005/0049991 A1 | 3/2005 | Aggarwal |
| 2005/0113991 A1 | 5/2005 | Rogers et al. |
| 2005/0154664 A1 | 7/2005 | Guy et al. |
| 2005/0177489 A1 | 8/2005 | Neff et al. |
| 2005/0192008 A1 | 9/2005 | Desai et al. |
| 2005/0197954 A1 | 9/2005 | Maitland et al. |
| 2005/0209892 A1 | 9/2005 | Miller |
| 2005/0209922 A1 | 9/2005 | Hofmeister |
| 2005/0246256 A1 | 11/2005 | Gastineau et al. |
| 2005/0251820 A1 | 11/2005 | Stefanik et al. |
| 2005/0256780 A1 | 11/2005 | Eldred |
| 2005/0267774 A1 | 12/2005 | Merritt et al. |
| 2005/0288954 A1 | 12/2005 | McCarthy et al. |
| 2005/0288998 A1 | 12/2005 | Verma et al. |
| 2006/0004731 A1 | 1/2006 | Seibel et al. |
| 2006/0010052 A1 | 1/2006 | Willingham |
| 2006/0015425 A1* | 1/2006 | Brooks ............ G06Q 40/00 705/35 |
| 2006/0020611 A1 | 1/2006 | Gilbert et al. |
| 2006/0031182 A1 | 2/2006 | Ryan et al. |
| 2006/0041443 A1 | 2/2006 | Horvath |
| 2006/0074991 A1 | 4/2006 | Lussier et al. |
| 2006/0080251 A1 | 4/2006 | Fried et al. |
| 2006/0085454 A1 | 4/2006 | Blegen et al. |
| 2006/0122921 A1 | 6/2006 | Comerford et al. |
| 2006/0178957 A1 | 8/2006 | LeClaire |
| 2006/0202012 A1 | 9/2006 | Grano et al. |
| 2006/0206416 A1 | 9/2006 | Farias |
| 2006/0218079 A1 | 9/2006 | Goldblatt et al. |
| 2006/0229799 A1 | 10/2006 | Nimmo et al. |
| 2006/0242039 A1 | 10/2006 | Haggerty et al. |
| 2006/0242046 A1 | 10/2006 | Haggerty et al. |
| 2006/0242047 A1 | 10/2006 | Haggerty et al. |
| 2006/0242048 A1 | 10/2006 | Haggerty et al. |
| 2006/0242050 A1 | 10/2006 | Haggerty et al. |
| 2006/0271472 A1 | 11/2006 | Cagan |
| 2006/0277092 A1 | 12/2006 | Williams |
| 2006/0282359 A1 | 12/2006 | Nobili et al. |
| 2006/0293921 A1 | 12/2006 | McCarthy et al. |
| 2006/0294199 A1 | 12/2006 | Bertholf |
| 2007/0011039 A1 | 1/2007 | Oddo |
| 2007/0011083 A1 | 1/2007 | Bird et al. |
| 2007/0027791 A1 | 2/2007 | Young et al. |
| 2007/0059442 A1 | 3/2007 | Sabeta |
| 2007/0067437 A1 | 3/2007 | Sindambiwe |
| 2007/0118393 A1 | 5/2007 | Rosen et al. |
| 2007/0124235 A1 | 5/2007 | Chakraborty et al. |
| 2007/0156515 A1 | 7/2007 | Hasselback et al. |
| 2007/0156554 A1 | 7/2007 | Nikoley et al. |
| 2007/0168246 A1 | 7/2007 | Haggerty et al. |
| 2007/0179798 A1 | 8/2007 | Inbarajan |
| 2007/0179860 A1 | 8/2007 | Romero |
| 2007/0185797 A1 | 8/2007 | Robinson |
| 2007/0192165 A1 | 8/2007 | Haggerty et al. |
| 2007/0208729 A1 | 9/2007 | Martino |
| 2007/0220611 A1 | 9/2007 | Socolow et al. |
| 2007/0226093 A1 | 9/2007 | Chan et al. |
| 2007/0226130 A1 | 9/2007 | Haggerty et al. |
| 2007/0226131 A1 | 9/2007 | Decker et al. |
| 2007/0244732 A1 | 10/2007 | Chatterji et al. |
| 2007/0250327 A1 | 10/2007 | Hedy |
| 2007/0271178 A1 | 11/2007 | Davis et al. |
| 2007/0282730 A1 | 12/2007 | Carpenter et al. |
| 2007/0282736 A1 | 12/2007 | Conlin et al. |
| 2007/0288271 A1 | 12/2007 | Klinkhammer |
| 2007/0288360 A1 | 12/2007 | Seeklus |
| 2007/0294163 A1 | 12/2007 | Harmon et al. |
| 2007/0299759 A1 | 12/2007 | Kelly |
| 2008/0015954 A1 | 1/2008 | Huber et al. |
| 2008/0052182 A1 | 2/2008 | Marshall |
| 2008/0059224 A1 | 3/2008 | Schechter |
| 2008/0059317 A1 | 3/2008 | Chandran et al. |
| 2008/0071882 A1 | 3/2008 | Hering et al. |
| 2008/0120155 A1 | 5/2008 | Pliha |
| 2008/0133325 A1 | 6/2008 | De et al. |
| 2008/0172324 A1 | 7/2008 | Johnson |
| 2008/0183504 A1 | 7/2008 | Highley |
| 2008/0215470 A1 | 9/2008 | Sengupta et al. |
| 2008/0221970 A1 | 9/2008 | Megdal et al. |
| 2008/0221990 A1 | 9/2008 | Megdal et al. |
| 2008/0228556 A1 | 9/2008 | Megdal et al. |
| 2008/0228635 A1 | 9/2008 | Megdal et al. |
| 2008/0235061 A1 | 9/2008 | Innes |
| 2008/0255897 A1 | 10/2008 | Megdal et al. |
| 2008/0294540 A1 | 11/2008 | Celka et al. |
| 2008/0294546 A1 | 11/2008 | Flannery |
| 2008/0301016 A1 | 12/2008 | Durvasula et al. |
| 2008/0301188 A1* | 12/2008 | O'Hara ............ G06F 16/907 |
| 2008/0312969 A1 | 12/2008 | Raines et al. |
| 2009/0018996 A1 | 1/2009 | Hunt et al. |
| 2009/0024505 A1 | 1/2009 | Patel et al. |
| 2009/0043637 A1 | 2/2009 | Eder |
| 2009/0060343 A1 | 3/2009 | Rosca |
| 2009/0076883 A1 | 3/2009 | Kilger et al. |
| 2009/0089205 A1 | 4/2009 | Bayne |
| 2009/0112650 A1 | 4/2009 | Iwane |
| 2009/0144201 A1 | 6/2009 | Gierkink et al. |
| 2009/0198557 A1 | 8/2009 | Wang et al. |
| 2009/0198602 A1 | 8/2009 | Wang et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |

(56) References Cited

U.S. PATENT DOCUMENTS

| | | |
|---|---|---|
| 2009/0222379 A1 | 9/2009 | Choudhuri et al. |
| 2009/0222380 A1 | 9/2009 | Choudhuri et al. |
| 2009/0228918 A1 | 9/2009 | Rolff et al. |
| 2009/0234665 A1 | 9/2009 | Conkel |
| 2009/0240609 A1 | 9/2009 | Cho et al. |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0271248 A1 | 10/2009 | Sherman et al. |
| 2009/0271296 A1 | 10/2009 | Romero |
| 2009/0276233 A1 | 11/2009 | Brimhall et al. |
| 2009/0276368 A1 | 11/2009 | Martin et al. |
| 2009/0313163 A1 | 12/2009 | Wang et al. |
| 2009/0327120 A1 | 12/2009 | Eze et al. |
| 2010/0030649 A1 | 2/2010 | Ubelhor |
| 2010/0094664 A1 | 4/2010 | Bush et al. |
| 2010/0094758 A1 | 4/2010 | Chamberlain et al. |
| 2010/0094774 A1 | 4/2010 | Jackowitz et al. |
| 2010/0145840 A1 | 6/2010 | Kasower |
| 2010/0145847 A1 | 6/2010 | Zarikian et al. |
| 2010/0161486 A1 | 6/2010 | Liu et al. |
| 2010/0169159 A1 | 7/2010 | Rose et al. |
| 2010/0198629 A1 | 8/2010 | Wesileder et al. |
| 2010/0217616 A1 | 8/2010 | Colson et al. |
| 2010/0250434 A1 | 9/2010 | Megdal et al. |
| 2010/0250497 A1 | 9/2010 | Redlich et al. |
| 2010/0293089 A1 | 11/2010 | Peterson et al. |
| 2010/0332292 A1 | 12/2010 | Anderson |
| 2011/0016042 A1 | 1/2011 | Cho et al. |
| 2011/0047071 A1 | 2/2011 | Choudhuri et al. |
| 2011/0060905 A1 | 3/2011 | Stack et al. |
| 2011/0071950 A1 | 3/2011 | Ivanovic |
| 2011/0093383 A1 | 4/2011 | Haggerty et al. |
| 2011/0112958 A1 | 5/2011 | Haggerty et al. |
| 2011/0137760 A1 | 6/2011 | Rudie et al. |
| 2011/0145122 A1 | 6/2011 | Haggerty et al. |
| 2011/0164746 A1 | 7/2011 | Nice et al. |
| 2011/0184838 A1 | 7/2011 | Winters et al. |
| 2011/0213641 A1 | 9/2011 | Metzger, II et al. |
| 2011/0219421 A1 | 9/2011 | Ullman et al. |
| 2011/0251946 A1 | 10/2011 | Haggerty et al. |
| 2011/0270706 A1 | 11/2011 | Anspach et al. |
| 2011/0276467 A1 | 11/2011 | Blackburn et al. |
| 2011/0320241 A1 | 12/2011 | Miller |
| 2012/0011158 A1 | 1/2012 | Avner et al. |
| 2012/0047219 A1 | 2/2012 | Feng et al. |
| 2012/0054592 A1 | 3/2012 | Jaffe et al. |
| 2012/0066065 A1 | 3/2012 | Switzer |
| 2012/0106801 A1 | 5/2012 | Jackson |
| 2012/0136768 A1 | 5/2012 | Megdal et al. |
| 2012/0158574 A1 | 6/2012 | Brunzell et al. |
| 2012/0216125 A1 | 8/2012 | Pierce |
| 2012/0254017 A1 | 10/2012 | Fusco et al. |
| 2012/0265607 A1 | 10/2012 | Belwadi |
| 2012/0271850 A1 | 10/2012 | Licata et al. |
| 2012/0323954 A1 | 12/2012 | Bonalle et al. |
| 2012/0331010 A1 | 12/2012 | Christie |
| 2013/0006809 A1 | 1/2013 | Hollenshead et al. |
| 2013/0080315 A1 | 3/2013 | Torrez et al. |
| 2013/0132151 A1 | 5/2013 | Stibel et al. |
| 2013/0159033 A1 | 6/2013 | Weinstock et al. |
| 2013/0173450 A1 | 7/2013 | Celka et al. |
| 2013/0218638 A1 | 8/2013 | Kilger et al. |
| 2013/0218751 A1 | 8/2013 | Chaudhuri et al. |
| 2013/0238455 A1 | 9/2013 | Laracey |
| 2014/0032265 A1 | 1/2014 | Paprocki et al. |
| 2014/0082017 A1 | 3/2014 | Miller |
| 2014/0258309 A1 | 9/2014 | Young |
| 2015/0227942 A1 | 8/2015 | Sidman et al. |
| 2015/0332411 A1 | 11/2015 | Bush et al. |
| 2015/0348145 A1 | 12/2015 | Nakajima |
| 2016/0012494 A1 | 1/2016 | Lasini |
| 2016/0180428 A1 | 6/2016 | Cain et al. |
| 2016/0217046 A1 | 7/2016 | Lamoureux et al. |
| 2016/0267588 A1 | 9/2016 | Cain et al. |
| 2016/0321726 A1 | 11/2016 | Singh et al. |
| 2017/0323295 A1 | 11/2017 | Kranzley et al. |
| 2018/0018723 A1 | 1/2018 | Nagla et al. |
| 2018/0107676 A1 | 4/2018 | Vora |
| 2018/0108189 A1 | 4/2018 | Park et al. |
| 2018/0165747 A1 | 6/2018 | Patten et al. |

FOREIGN PATENT DOCUMENTS

| | | |
|---|---|---|
| EP | 2 088 743 | 8/2009 |
| KR | 10-2004-0078798 | 9/2004 |
| WO | WO 2008/022289 | 2/2008 |
| WO | WO 2008/054403 | 5/2008 |
| WO | WO 2008/147918 | 12/2008 |
| WO | WO 2009/117518 | 9/2009 |
| WO | WO 2009/132114 | 10/2009 |
| WO | WO 2010/062537 | 6/2010 |
| WO | WO 2010/132492 | 11/2010 |
| WO | WO 2014/018900 | 1/2014 |

OTHER PUBLICATIONS

U.S. Appl. No. 12/705,489, filed Feb. 12, 2010, Bargoli et al.
U.S. Appl. No. 12/705,511, filed Feb. 12, 2010, Bargoli et al.
BBC Green Home, "My Action Plan", as printed from The Wayback Machine at http://web.archive.org/web/20080513014731/http://www.bbcgreen.com/actionplan, May 13, 2008, pp. 50.
BERR: Department for Business Enterprise & Regulatory Reform, "Regional Energy Consumption Statistics", Jun. 10, 2008, http://webarchive.nationalarchives.gov.uk/20080610182444/http://www.berr.gov.uk/energy/statistics/regional/index.html.
Caliendo, et al., "Some Practical Guidance for the Implementation of Propensity Score Matching"; IZA:Discussion Paper Series; No. 1588; Germany; May 2005.
"Carbon Calculator—Calculation Explanation," Warwick University Carbon Footprint Project Group, 2005, pp. 5, http://www.carboncalculator.co.uk/explanation.php.
Cohen et al., "Optimizer: IBM's Multi Echelon Inventory System for Managing Service Logistics", Interfaces, vol. 20, pp. 65-82, Jan.-Feb. 1990.
"Debt Settlement: Watch Video on how to Pay Your Debt Faster", http://www.debtconsolidationcare.com/debt-settlement.html printed Jan. 9, 2013 in 6 pages.
Energy Saving TrustTM, "HEED Online User Manual (1.7)", Jul. 24, 2008, pp. 18, www.energysavingtrust.org.uk, Jul. 24, 2008.
Experian-Scorex Announces New Credit Simulation Tool, PR Newswire, Costa Mesa, CA, Jun. 13, 2005.
Fanelli, Marc; "Building a Holistic Customer View"; MultiChannel Merchant; pp. 2; Jun. 26, 2006.
Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.
Handfield, Robert B. et al., "Managing Component Life Cycles in Dynamic Technological Environments", International Journal of Purchasing and Materials Management, Tempe, vol. 30, Iss. 2, p. 20, 9 pgs., Spring 1994, ProQuest ID 590096.
Inderfurth et al., "Decision Support for Spare Parts Acquisition in Post Product Life Cycle", Central European Journal of Operations Research, vol. 16, pp. 17-42, 2008 [Initially published online Dec. 21, 2007].
Instant Access to Credit Reports Now Available Online with DMS' CreditBrowser-based system also Simplifies Credit Decisioning and Offers a Central Point of Control, Business Wire, p. 0264, Dallas, May 23, 2000.
"Intelligent Miner Applications Guide"; Chapters 4-7; pp. 33-132; IBM Corp., Apr. 2, 1999.
Jowit, Juliette, "Ever wondered how big your own carbon footprint might be?", Nov. 4, 2007, pp. 4, http://www.guardian.co.uk/money/2007/nov/04/cash.carbonfootprints/print.

(56) References Cited

OTHER PUBLICATIONS

Käki, Anssi, "Forecasting in End-Of-Life Spare Parts Procurement", Master's Thesis—Helsinki University of Technology System Analysis Laboratory, Jul. 27, 2007.
Kim, Bowon et al., Optimal Pricing, EOL (End of Life) Warranty, and Spare Parts Manufacturing Strategy Amid Product Transition, European Journal of Operation Research, vol. 188, pp. 723-745, 2008 [Initially published online May 1, 2007].
Krupp, James A.G.; "Forecasting for the Automotive Aftermarket"; The Journal of Business Forecasting Methods & Systems; Winter 1993-1994; 12, 4; ABI/Inform Global; pp. 8-12.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lapide, Larry, "New Developments in Business Forecasting", The Journal of Business Forecasting, pp. 12-14, Spring 2002.
Moore, John R., Jr. "Forecasting and Scheduling for Past-Model Replacement Parts" Management Science, Application Series, vol. 18, No. 4, Part 1, Dec. 1971, pp. B200-B213.
Packer, A. H., "Simulation and Adaptive Forecasting an Applied to Inventory Control", Operations Research, vol. 15, No. 4, pp. 660-679, Jul. 1965.
Peters, Peter-Paul, "A Spare Parts Configurator for the European Service Business" (Graduation Report); Honeywell, Industrial Service Logistic Center; Amsterdam, The Netherlands; 80 Pgs.; Mar. 2000.
Porter, G. Zell, "An Economic Method for Evaluating Electronic Component Obsolescence Solutions", Retrieved from the web at www.gidep.org/data/dmsms/library/zell.pdf, May 1998, pp. 1-9.
"PremierGuide Announces Release 3.0 of Local Search Platform", Business Wire, p. 5574, Palo Alto, CA, Mar. 4, 2004.
"Qualifying for Debt Settlement", http://www.certifieddebt.com/debt/settlement-qualifications.shtml printed Jan. 9, 2013 in 2 pages.
"Resolve Debt for Less: With Help from Freedom Financial", http://www.debtsettlementusa.com/ printed Jan. 9, 2013 in 6 pages.
Roos, Gina, "Web-Based Service Helps OEMs Cure Parts Obsolescence Blues", Electronic Engineering Times, p. 86, Oct. 8, 2001, Dialog 09056737 78968668.
Santarini, Michael, "Forecasts the Probably Obsolescence of Components—Module Predicts Parts Life", Electronic Engineering Times, Jan. 11, 1999, p. 48(1), Dialog 0607160353548246.
"Settling Your Debts—Part 1 in Our Debt Settlement Series", http://www.creditinfocenter.com/debt/settle_debts.shtml printed Jan. 9, 2013 in 6 pages.
Sullivan, Laurie, "Obsolete-Parts Program Thriving", EBN, Manhasset, Issue 1296, p. 26, Jan. 2002, ProQuest 10 101195090.
Tao, Lixin, "Shifting Paradigms with the Application Service Provider Model"; Concordia University, Canada; IEEE; Oct. 2001.
Thoemmes, Felix, "Propensity Score Matching in SPSS", Center for Educational Science and Psychology, University of Tübingen, Jan. 2012.
Webster, Lee R., "Failure Rates & Life Cycle Costs", Consulting-Specifying Engineer; 23, 4; ABI/INFORM Global, Apr. 1998, p. 42.
Wiedmann, et al., "Report No. 2: The use of input-output analysis in REAP to allocate Ecological Footprints and material flows to final consumption categories", Resources and Energy Analysis Programme, Stockholm Environment Institute—York, Feb. 2005, York, UK, pp. 33.
Summons to Attend Oral Proceedings in European Application No. 07800133, dated Nov. 15, 2012.
Preliminary Opinion in European Application No. 07800133, dated Feb. 14, 2013.
International Search Report and Written Opinion in PCT Application No. PCT/US07/76152, dated Mar. 20, 2009.
International Search Report and Written Opinion for Application No. PCT/US09/60393, dated Dec. 23, 2009.
International Search Report and Written Opinion for Application No. PCT/US09/37565, dated May 12, 2009.
International Search Report and Written Opinion for Application No. PCT/US10/34434, dated Jun. 23, 2010.
BackupBox, http://mybackupbox.com printed Feb. 8, 2013 in 2 pages.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.
Fisher, Joseph, "Access to Fair Credit Reports: Current Practices and Proposed Legislation," American Business Law Journal, Fall 1981, vol. 19, No. 3, p. 319.
Garcia-Molina, "Database Systems: The Complete Book", Prentice Hall, 2002, pp. 713-715.
Hojoki, http://hojoki.com printed Feb. 8, 2013 in 5 pages.
IFTTT, "About IFTTT", http://ifttt.com/wtf printed Feb. 18, 2013 in 4 pages.
Mint.com, http://www.mint.com/how-it-works/ printed Feb. 5, 2013 in 2 pages.
Minutes of Oral Proceedings in European Application No. 07800133, dated Apr. 2, 2013.
Mover, "One API for the Cloud", http://mover.io printed Feb. 6, 2013 in 3 pages.
Otixo, "Your Dashboard for the Cloud", http://Otixo.com/product printed Feb. 6, 2013 in 3 pages.
Pipes, http://pipes.yahoo.com/pipes printed Feb. 18, 2013 in 1 page.
Planwise, http://planwise.com printed Feb. 8, 2013 in 5 pages.
Primadesk, http://primadesk.com printed Feb. 8, 2013 in 1 page.
Storage Made Easy(SME), http://storagemadeeasy.com printed Feb. 6, 2013 in 1 page.
Zapier, "Integrate Your Web Services", http://www.Zapier.com, printed Feb. 18, 2013 in 3 pages.
Buxfer, http://www.buxfer.com/ printed Feb. 5, 2014 in 1 page.
Check, http://check.me/ printed Feb. 5, 2014 in 3 pages.
International Preliminary Report on Patentability for Application No. PCT/US2010/034434, dated Feb. 4, 2014.
Manilla, http://www.manilla.com/how-it-works/ printed Feb. 5, 2014 in 1 page.
Mvelopes, http://www.mvelopes.com/ printed Feb. 5, 2014 in 2 pages.
PersonalCapital.com, http://www.personalcapital.com/how-it-works printed Feb. 5, 2014 in 5 pages.
Yodlee | Money Center, https://yodleemoneycenter.com/ printed Feb. 5, 2014 in 2 pages.
You Need a Budget, http://www.youneedabudget.com/features printed Feb. 5, 2014 in 3 pages.
"Activant PartExpert with Vehicle Identification Number (VIN) Lookup", Copyright 2006, pp. 1-2. [Best Available Copy].
"Auto Market Statistics:Drive Response with Aggregated Motor Vehicle Information"; Experian; Apr. 2007; http://www.experian.com/assets/marketing-services/product-sheets/auto-market-statistics.pdf.
Bala, Pradip Kumar, "Purchase-Driven Classification for Improved Forecasting in Spare Parts Inventory Replenishment," International Journal of Computer Applications, Nov. 2010, vol. 10, No. 9, pp. 40-45.
"Consumer Reports Finds American-Made Vehicles Close Reliability Gap with European-Made Vehicles—As Japanese Continue to Set New Benchmarks for the Industry." Consumer Reports, http://www.consumerreports.org/content/Pressroom/Presseng/PDF/eng0304rel.pdf, Apr. 2003, pp. 2.
Farrell et al., "Installed Base and Compatibility: Innovation, Product Preannouncements, and Predation," The American Economic Review, Dec. 1986, vol. 76, No. 5, pp. 940-955.
Grange, Frank, "Challenges in Modeling Demand for Inventory Optimization of Slow-Moving Items," Proceedings of the 1998 Winter Simulation Conference, 1998, pp. 1211-1217.
Jaro, Matthew A., "Probabilistic Linkage of Large Public Health Data Files," Statistics in Medicine, 1995, vol. 14, pp. 491-498.
Kennedy, et al., "An Overview of Recent Literature on Spare Parts Inventories," International Journal of Production Economics, 2002, vol. 76, pp. 201-215.
Official Communication in Canadian Application No. 2,660,493, dated Aug. 14, 2014.

(56) References Cited

OTHER PUBLICATIONS

Reinbach, Andrew; MCIF aids banks in CRA Compliance, Bank Systems & Technology, Aug. 1995, vol. vol. 32, Issue No. 8, pp. pp. 27.

Shapiro et al., "Systems Competition and Aftermarkets: An Economic Analysis of Kodak," The Antitrust Bulletin, Spring 1994, pp. 135-161.

U.S. Appl. No. 11/893,609, U.S. Pat. No. 8,005,759, System and Method for Providing a Score for a Used Vehicle, filed Aug. 16, 2007.

U.S. Appl. No. 13/214,877, U.S. Pat. No. 8,392,334, System and Method for Providing a Score for a Used Vehicle, filed Aug. 22, 2011.

\* cited by examiner

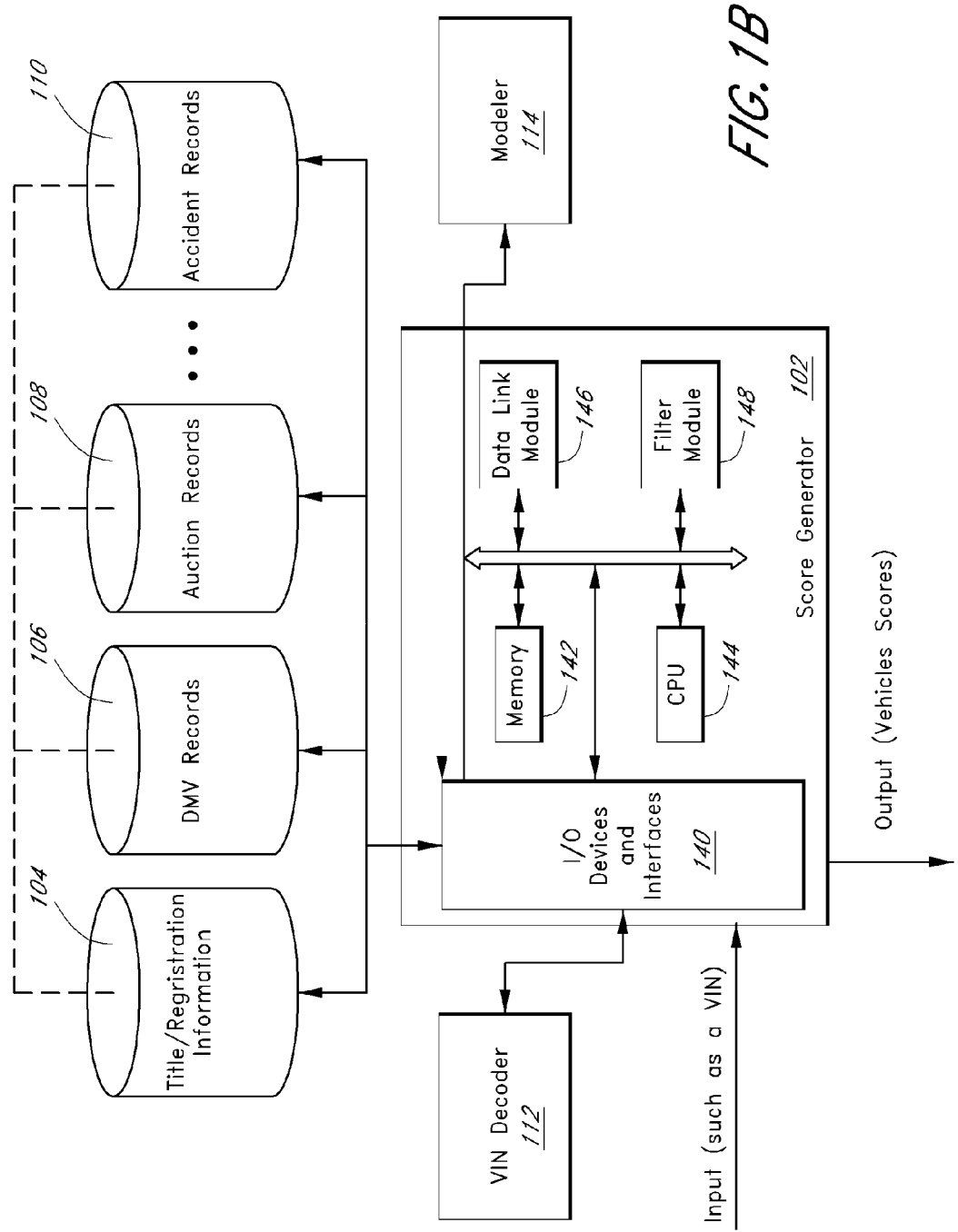

AutoCheck VehicleScore™

AutoCheck has analyzed the available data for VIN XXXXXXXXXXXXX, found to be a 1999 Nissan Altima XE and we report a low, medium or high rating for a number of factors. These factors may or may not be important to a vehicle buyer.

| AutoCheckFactor | Low | Medium | High |
|---|---|---|---|
| Title Brand Factor<br>State Title Brands or other issue like auction announced as salvage record | No brand or issue found | | |
| Vehicle Use Factor<br>Fleet, rental, taxi, drivers education use | | Rental use reported | |
| Location Factor<br>Check for storm area registration, coastal, and high salt use areas | | | Registered in storm area |
| Miles Over Time Factor<br>Average yearly use calculated to be 15,000 miles a year | | Some more than expected | |
| Owners Over Time Factor<br>Average number of owners is estimated to be one new owner every 2.5 years | | | 4 more than expected |
| Accident Risk Rating<br>Rating reported accidents and reported severity over time | | Moderate damage risk | |
| Maintenance Costs<br>Average maintenance costs vs. similar vehicles in class | | | High range |

FIG. 3

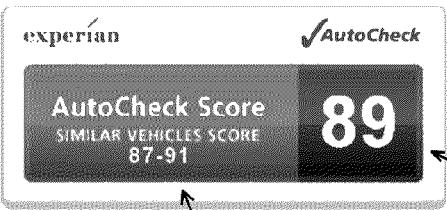
FIG. 6

SYSTEM AND METHOD FOR PROVIDING A SCORE FOR A USED VEHICLE

RELATED APPLICATIONS

This application is a continuation of U.S. application Ser. No. 13/214,877, filed Aug. 22, 2011, to be issued as U.S. Pat. No. 8,392,334, which is a continuation of U.S. application Ser. No. 11/893,609, filed Aug. 16, 2007, to be issued as U.S. Pat. No. 8,005,759, which claims priority to U.S. Provisional Application No. 60/838,468 filed Aug. 17, 2006; U.S. Provisional Application No. 60/888,021 filed Feb. 2, 2007; and U.S. Provisional Application No. 60/949,808 filed Jul. 13, 2007, each titled "System and Method for Providing a Score for a Used Vehicle;" the contents of all these applications are hereby incorporated by reference in their entireties.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND

Field of the Disclosure

This disclosure relates generally to automated vehicle analysis systems for grading and analyzing used vehicles.

Description of the Related Art

Buying a car can often be a difficult proposition. It is typically one of the more expensive purchases that people make. There are many different cars available, each having slightly different features, and prospective purchasers have numerous factors to take into account. The car buying process is often only exacerbated when purchasing a used car. There are few standards available to determine the quality of used cars and to determine whether the price is reasonable. It is therefore often difficult to accurately compare different used cars, both between two or more cars having similar or identical make, model, and year as well as among all used cars.

One information source that attempts to classify the relative values of cars is the Kelley Blue Book®. This guide attempts to give approximate pricing values to used cars based on their make, model, year, and some other features. This can often be an imprecise guide, however, because the condition of the vehicle is often estimated and specific occurrences in the life of a given vehicle are not taken into account.

Vehicle history reports can be used to determine more precise information about a specific vehicle, but often these reports provide a wealth of data without providing an overall picture of what that data means. Comparisons of multiple vehicle history reports can be a time-consuming process—the wealth of data may necessitate time to do a line-by-line comparison and may be difficult to even judge just how different line-items affect the quality or term of life of the different cars.

SUMMARY

As such, there is a need for a system and method to help provide a potential buyer with a quick determination of how various used cars compare to each other. The present disclosure provides a system for automated vehicle analysis and a method for providing a potential buyer or other user with, in an embodiment, a numerical vehicle score. In an embodiment, the vehicle score provides a relative ranking of a specific used car versus all used cars. In another embodiment, the vehicle score provides a relative ranking of a specific car versus other used cars of the same make, model, and/or year, while yet another score may relate to a given class of vehicles (such as SUVs, luxury sedans, trucks, economy cars, and the like). In another embodiment, the vehicle score provides an absolute score, rather than a relative one. This may correspond to a probability that a car will be on the road in five, seven, ten years, or the like. In another embodiment, the vehicle score is a determinant on the vehicle valuation as published by guide companies such as Kelley Blue Book and NADA Used Car Guides. In yet another embodiment, the vehicle score can be calculated from the time the vehicle is first sold to the present day. For instance, a vehicle score for a five year old vehicle can be calculated one time for each year of the vehicle's life, so that multiple scores steadily or rapidly decline based on the reported vehicle's history. Additionally, this same vehicle's score can also be projected into the future, showing, for example, how a vehicle's score may further decline over five years. In an embodiment, this may be based on the vehicle's current mileage, recent usage factors and the like.

One aspect of the present disclosure provides a vehicle scoring method, including electronically receiving a vehicle identification, from a user; retrieving a set of vehicle records from at least one data source; linking vehicle records that correspond to a common vehicle; identifying a set of vehicle factors from the linked vehicle records based on a first set of filter criteria; providing weighted values for each factor in the set based on a second set of filter criteria; combining the weighted values into a vehicle score; and electronically providing the score to the user system. Another aspect of the disclosure provides a method of vehicle scoring that includes: accepting a vehicle identification indicative of a vehicle; retrieving attributes associated with the vehicle; assigning values to the attributes relative to average values for a universe of vehicles; weighting the assigned values; and determining an overall score. In one embodiment, the vehicle scoring method is specifically tailored to pre-owned vehicles and includes attributes relating to the vehicle's history.

Another aspect of the present disclosure provides a vehicle scoring system that includes: a computer system having a processor that supports operation of a software application; a data storage module that includes a number of vehicle data records and can communicate with the computer system; a filter module including three filters—one for extracting relevant vehicle-related data from the data storage module, a second for valuing the relevant vehicle-related data, and a third for combining the values into a vehicle score; and an output module for reporting the vehicle score to a user. In an embodiment, the computer system is capable of accepting a vehicle identifier and communicating the identifier to the filter module for use in one or more of the filters. Yet another aspect of the present disclosure provides a system for generating a vehicle score. The system includes one or more databases of vehicle information such as physical attributes and historical data regarding specific vehicles. The system also includes a score generating module capable of assigning values to vehicle attributes, weighting the assigned values, and combining the weighted values in an overall score. In one embodiment, the system evaluates each of a number of attributes of a specified vehicle against the same attributes of other vehicles and assigns a value to each attribute or set of attributes; typically this will be a numerical value. These values are weighted depending on which factors have more or less effect on a vehicle's life expectancy, future monetary value, or the like, and a final score is then determined by merging the weighted factors. In one embodiment, the system also includes a network interface module and/or is associated with a web server, allowing a user to access the internet, browse to a web site, enter a vehicle identifier, and have the score displayed on a web site.

In an embodiment, a system in accordance with the disclosure gathers a large amount of data from a number of different databases and data sources. This data can be linked to provide overall pictures of individual vehicle histories. Due to the large amount of data, in an embodiment, when determining a vehicle score, a first filter is applied to restrict the data to that which is deemed relevant to the scoring process. A second layer filter can also be applied to translate the relevant data to numerical or other easily scored values. A third layer filter can also be applied to provide weighted values, and a final filter can be applied to combine each weighted value into an overall score. Different combinations and sets of filters may be used to provide scores for individual vehicles (1) versus all others; (2) versus similar classes, makes, and/or models; (3) versus similar model years; and the like.

For purposes of summarizing this disclosure, certain aspects, advantages and novel features of the disclosure have been described herein. Of course, it is to be understood that not necessarily all such aspects, advantages or features will be embodied in any particular embodiment of the disclosure.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit its scope. Throughout the drawings, reference numbers are reused to indicate correspondence between referenced elements.

FIG. 1B illustrates a block diagram detailing an embodiment of a score generator in a system for generating a vehicle score.

FIG. 3 illustrates a sample output box displaying the relative risk ratings of factors that may go into a score in accordance with an embodiment of the present disclosure.

FIG. 6 illustrates a sample output box for display of a score to a user in accordance with an embodiment of the present disclosure.

DETAILED DESCRIPTION OF PREFERRED EMBODIMENTS

Figure 1:
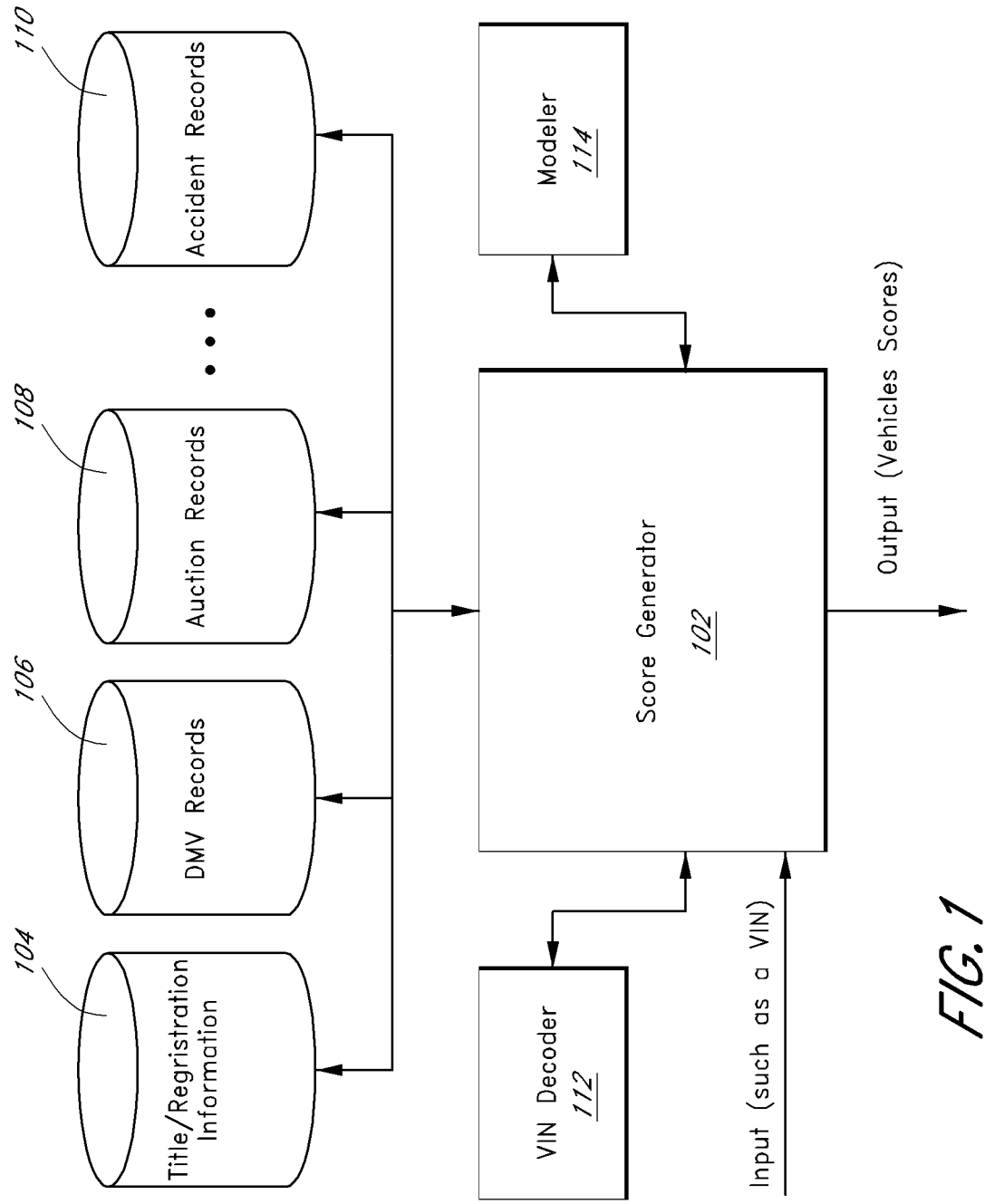
FIG. 1 illustrates a block diagram of an embodiment of a system for generating a vehicle score.

In one embodiment, an automated vehicle analysis system receives data from one or more databases that store vehicle information, and applies a multi-layer set of filters to the data to generate a vehicle score for a used automobile. The vehicle score is preferably simple in its presentation. In an embodiment, the multi-layered filters filter data using various factors such as, for example, vehicle age, mileage, location of use, number of owners, and number and type of accidents reported to determine a numerical value representative of the overall characteristics of a vehicle. In one embodiment, this score may represent the likelihood that a car will still be on the road in five years, for example. In one embodiment, a single vehicle may receive two sets of numerical scores—one set defining its position with respect to all makes and models, and the second defining its position with respect to same make/model/year vehicles.

In this way, for example, a 2002 Lexus ES having had several owners and high mileage may score well in general, but may be in the lower half when compared to all other 2002 Lexus ES vehicles. Conversely, a 1993 Nissan Sentra with relatively low mileage and one owner may score poorly in general, but well against all other 1993 Nissan Sentras that are still on the road.

The automated vehicle analysis system and methods go well beyond presenting facts about a given vehicle and instead automatically interpret the voluminous amounts of data to quickly deliver helpful decision information to a user in a generally easily understood format.

In an embodiment, the scores may represent a relative probability that a specific car will remain on the road in five (5) years compared to all vehicles and those of the same make/model/year. In other embodiments, the score or scores may represent an actual percent probability that a given car will be on the road in a specific number of months or years.

Various embodiments and examples of the systems and methods for scoring a vehicle will now be described with reference to the drawings. Like numbers indicate corresponding parts among the drawings and the leading digit represents the figure in which such part was first shown.

Example Score

Before delving into the details of the system and method, it may be instructive to set out an example of one embodiment. A prospective purchaser, or user, may be in the market for a used car. The user finds three cars that are of interest and fall within the desired price range. One vehicle is a black 2002 Jeep Grand Cherokee; a second is a burgundy 2003 Ford Explorer; and a third is a silver 2002 Jeep Grand Cherokee. Wishing to compare the three SUVs, the user may obtain the Vehicle Identification Number (VIN) for each vehicle and go to a website associated with a system according to the present disclosure. When the user enters each VIN, the number is transferred to an automated vehicle analysis system.

This system retrieves vehicle specifications as well as reported history items from, in one embodiment, third party providers of such information. As such, further details on the vehicle are identified. For example, the black Jeep, may have 40,231 miles on it, have been owned by two individuals, been registered in Chicago, may have been in one moderately classified accident, have received all regular maintenance, and been reported stolen once. The Explorer on the other hand may have 34,254 miles, been owned by one company for use as a rental car, been registered in Iowa, and been in three minor accidents. While this information in and of itself may be helpful, it is often hard to compare the two vehicles based on this information. For example, it may look better that the Explorer has fewer miles, but it may be hard to determine whether city or rural driving is more damaging. Similarly the effects of individual usage versus rental usage or the fact of having been reported as stolen versus having had three minor accidents can be difficult to compare.

As such, a system as disclosed herein uses information related to a large number of vehicles to create and apply multi-layer filters that automatically organize and manage incoming vehicle data to provide vehicle scores. This process helps determine which factors are more or less important in determining whether a vehicle will be on the road in, for example, five years. In an embodiment, a filter that extracts the data relevant to each of these factors generally comprises the first layer filter. This first layer can help reduce the processing resources required in further steps. For example, in an embodiment, information such as auction records and whether or not a vehicle has been rented commercially may be filtered out as irrelevant. It is understood, however, that the same data may or may not be used or filtered out in various embodiments.

In an embodiment, the factors may be translated into numerical values through a second filter layer. A third layer filter comprises a weight assigned to each factor based on the relative importance of each factor in the overall score. This third layer filter is applied to the data representative of each individual vehicle, and the weighted values are combined to generate the score. To further the example, the black Jeep may receive a score of 85, the Explorer a 77, and the silver Jeep an 80 (each with similar vehicle scoring between 84 and 78). The user, upon obtaining each of these values, then has a simple, standardized way of comparing each vehicle. The black Jeep has the best score of the three, and a user may decide to make that purchase, because it is most likely to last the greatest amount of time. Additionally, however, the user may use these scores to haggle prices with the dealers. For example, the silver and the black Jeeps seem relatively close in score, but the user may be able to negotiate a better price on the Silver Jeep based on its slightly lower score. In that case, it may be worth giving up a bit on the score to gain the better price.

Also, in one embodiment, the system may give scores or relative values of some or all of the various factors, so that the user can get a sense of which factors had the most or least effects on the overall score.

System

Turning to FIG. 1, in an embodiment, a system for generating vehicle scores includes a score generator 102 and any of a number of vehicle information databases or data sources. These databases may include Title and/or Registration Information database 104, Department of Motor Vehicle Records 106, Auction Records 108, and/or Accident Records 110. Vehicle information may also be obtained or derived from dealer records, state agency records, independent agency records, and the like. Vehicle information may be gathered from one or more of these databases or data sources into a primary vehicle database or stored in separate databases for use by the score generator 102 as needed. A system may also include a modeler 114 that helps determine the weighting of various factors to be used in a score. In an embodiment, the modeler 114 may include an actual or simulated neural network to help determine factor weightings. In an embodiment, modeler 114 may be a background process or module that may be run periodically regardless of specific score requests. Potential modeling processes are described in more detail below.

A more detailed view of an embodiment of a score generator 102 in accordance with the teachings of this disclosure is pictured in FIG. 1B. Score generator 102 may preferably include one or more input/output (I/O) devices and interfaces 140 for communications with, for example, the databases 104, 106, 108, 110, a VIN decoder 112, and a modeler 114. Input from users and output from the score generator 102 may also be communicated through the I/O devices 140. Typically a score generator will also include one or more memory units 142 and one or more central processing units (CPUs) 144. A preferred embodiment of the score generator 102 will also include a data link module 146 and a filter module 148. The data link module 146 advantageously provides linking of associated data from the various databases 104, 106, 108, and 110. Through the data link module 146, the databases, which may store data in differing formats and/or according to different database keys, the score generator 102 may create a more complete picture of individual automobiles. In other embodiments, the data received from third parties is parsed by the data link module 146 and stored in a database in a linked format. Similarly, there may be a large number of databases storing both useful and extraneous information; in an embodiment, the filter module 148 may include a multi-layer filter or filter matrix. One or more layers can help reduce the amount of data being processed to that which is useful. The filter module 148 thus helps provide more efficient processing task for the CPU 144. The filter module 148 may additionally contain filter layers that translate and provide weighting to factors for scoring. In an embodiment, I/O devices 140, memory 142, CPU 144, the data link module 146, and the filter module 148 may be connected through a bus, network, or other connection. In an embodiment, the modeler 114 comprises a filter generator for filter module 148.

In an embodiment, an I/O device 140 of a score generator 102 accepts an input—such as a VIN—representing the vehicle to be scored. This information may be stored temporarily in memory 142 or used to retrieve vehicle attribute and history information from the various databases—or retrieve one file or complete database entry in the case of a combined primary vehicle database, or retrieve information from a combination of a combined primary vehicle database and one or more of the others. A VIN may also be passed to a VIN decoder 112 through an I/O device 140 to retrieve vehicle attribute information, such as make, model, year, country of manufacture, engine type, and the like. This is possible because VINs are unique identifiers with such information coded into them according to a standard that is agreed upon by car manufacturers.

In an embodiment, the score generator 102 may then select attributes that will be factors in the scoring. In an embodiment, the data link module 146 accepts records from the various databases 104, 106, 108, 110 and/or outside sources and links together records that correspond to the input VIN. Some records may not have an associated VIN, in which case the data link module 146 can utilize some other common element or set of elements to link the records. For example, many records that do not include a VIN include a license plate number which can be used in conjunction with a record, such as a DMV report to link the VIN. As license plates may be transferred among cars, the dates of the disparate records may help dissociate ambiguities. The filter module 148, in an embodiment, can filter the incoming records from the databases to limit extraneous data that is linked by the data link module 146. In an alternative embodiment, the data link module 146 may link all incoming data associated with a VIN, and then pass the linked information to the filter module 148 to filter out extraneous data. Additional filter layers for filter module 148 may convert the target vehicle's attributes into numerical values for those factors. This conversion for each factor value may be based in whole or in part on a comparison with an average factor value for the vehicles in the comparison pool (such as all vehicles, a specific vehicle class, or a specific make/model/year). Yet another filter layer may then multiply each of these factor values by a weight for the given factor; the results are summed to create a representative score. The weighting filter layer gives each factored attribute a larger or smaller impact on the final score based on factors that are more or less important. A representative example will be discussed below to help give a more concrete representation of these concepts.

Once a vehicle score is determined it may be output to the requesting user via a display screen, a printer, output audibly, and the like. In an embodiment, the score generator 102 may be connected to or part of a web server that accepts queries from users via the internet, such as by a web browser. For example, a user may utilize an internet browser to access a website, such as Autocheck.com (www.autocheck.com) or other website currently operated by the assignee of the present disclosure. The user may enter the VIN number of a 2002 Audi A4 that he or she is considering purchasing; this VIN number is relayed to the score generator 102. In other embodiments, the use may enter a VIN on a third party website, which will be passed to the score generator 102. Score generator 102 retrieves information about that car. In doing so, it may independently verify the make, model, and year of the car. It may also retrieve the number of registered owners based on DMV or other records; the number and severity of accidents reported based on police reports, insurance company claims, or some other source; the locations registered; and the like. These factors may be selected and given individual values. For example, if no accidents were reported, the car may receive a ten (10), a car with one minor accident a seven (7), a car that was in several major accidents a two (2), etc. Each of the factors is then weighted. For example, the accident value may be relatively important and be weighted at six-tenths (0.6), while the location used may be less important and receive only a weighting of two-tenths (0.2). All of these resulting values may then be added to receive a final score, such as that the car ranks a 7.8 against all cars. A different pass through the score generator 102, may show that the car only ranks a 4.6 against all other 2002 Audi A4s, however. In an embodiment, this may indicate that the specific car is well more likely than the average car to still be on the road in five years, but that it is somewhat less likely than the average 2002 A4 to be on the road in five years (assuming an average value of five (5) for each).

In an embodiment, the score generator 102 may output the final score (or scores) to the user as a portion of a web page operated by the operator of the present system. In other embodiments, the final score or scores may be sent to a third party web server for display on a web page of a third party.

System Information

The various features and functions described in this document may be embodied in software modules executed by one or more general purpose computing devices or components, such as the CPU 144. The modules may be stored in any type of computer readable storage medium or device.

Suitable hardware for a vehicle scoring system includes a conventional general purpose single-chip or multi-chip microprocessor such as a Pentium® processor, a Pentium® II processor, a Pentium® Pro processor, an xx86 processor, an 8051 processor, a MIPS® processor, a Power PC® processor, or an ALPHA® processor. In addition, the microprocessor may be any conventional special purpose microprocessor such as a digital signal processor. Furthermore, the score generator 102 may be used in connection with various operating systems such as: Microsoft® Windows® 3.x, Microsoft® Windows 95, Microsoft® Windows 98, Microsoft® Windows NT, Microsoft® Windows XP, Microsoft® Windows CE, Palm Pilot OS, OS/2, Apple® MacOS®, Apple® OS X®, Disk Operating System (DOS), UNIX, Linux®, VxWorks, or IBM® OS/2®, Sun OS, Solaris OS, IRIX OS operating systems, and so forth. In an embodiment, an I/O device and interface 140 may be a network device and a network interface module to facilitate communication between it and user access points. The VIN decoder 112, databases 104, 106, 108, 110, and/or the modeler 114 may be implemented on the same or disparate hardware as the score generator 102. For example, in an embodiment, one or more of the modeler, 114, databases 104, 106, 108, 110, and/or VIN decoder 112 are part of the score generator 102.

User Access

As stated, user access may be through a web-enabled user access point such as the user's personal computer or other device capable of connecting to the Internet. Such a device will likely have a browser module that may be implemented as a module that uses text, graphics, audio, video, and other media to present data and to allow interaction with data via the communications network. The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices and may also include software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user. The input device(s) may include a keyboard, roller ball, pen and stylus, mouse, trackball, voice recognition system, or pre-designated switches or buttons. The output device(s) may include a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In one embodiment, a user access point comprises a personal computer, a laptop computer, a Blackberry® device, a portable computing device, a server, a computer workstation, a local area network of individual computers, an interactive kiosk, a personal digital assistant, an interactive wireless communications device, a handheld computer, an embedded computing device, or the like.

Sample Scoring Process

Figure 2:
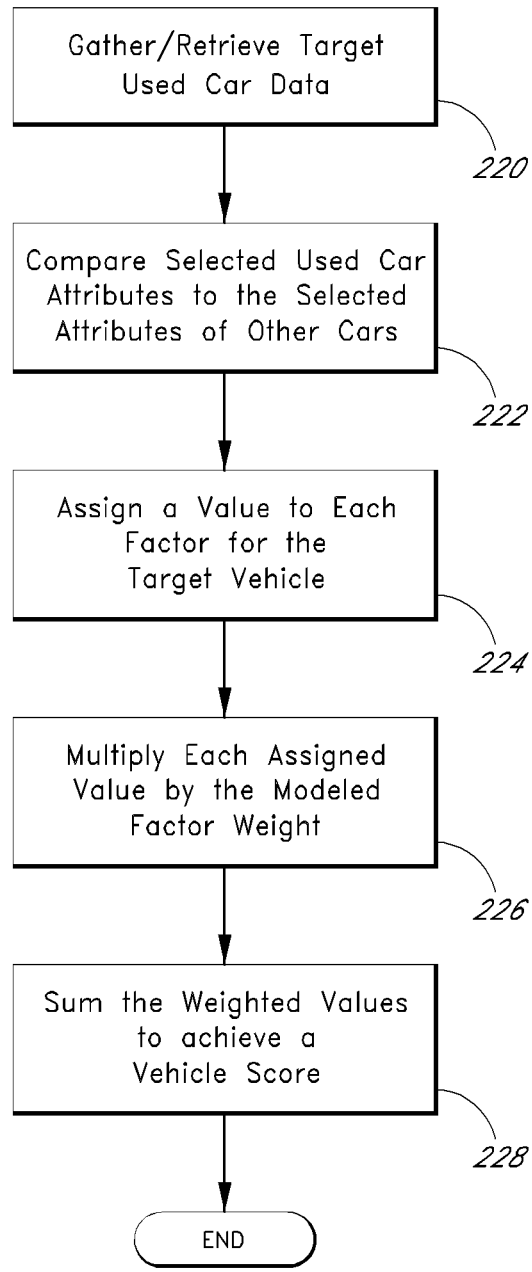
FIG. 2 illustrates a flow diagram of a vehicle scoring method in accordance with an embodiment of the present disclosure.

Although a process that score generator 102 may go through in an embodiment of the present disclosure was discussed briefly above, another process embodiment and some alternatives will be discussed with reference to FIG. 2. Beginning with a vehicle identifier, such as a VIN, or a set of identifiers, data on the target vehicle is gathered or retrieved in block 220; the data link module 146 may help link the disparate records that are gathered. This may be from a precompiled database or one or more of the sources discussed above. This information preferably at least includes information relating to each factor going into the scoring. If there is missing or unreported information, a negative factor value may be presumed or the factor may be disregarded. Alternatively, an average value may be presumed. If any factors do not necessarily reflect complete data, this can be reported to the user in order to provide the user a gauge of the score's potential error.

In block 222, data gathered on the target vehicle is compared to the other vehicles in the database. Target attributes may be compared to actual vehicle data or a precompiled amalgamation of the vehicles of a given class. For example, the average number of owners, the average mileage, and other average values may be predetermined and stored for easy comparison. This precompilation of data may be preferable to reduce processing resources required for each score request. Preferably, in an embodiment, these hypothetical average cars are created for each class for which scoring is available. For example, in an embodiment, the system may store the attributes of a hypothetical average overall car, as well as hypothetical average make/model combinations.

Based in part on these comparisons, various factors going into the vehicle score are translated into numerical values for the target car in block 224; this may be accomplished through one or more layers of a filter module 148. In some embodiments, these individual factor values may be reported to the user, in numerical or graphical form. A sample output of such data is shown in FIG. 3. Each of the factors listed therein are possible factors in one or more embodiments, and more will be discussed below. In FIG. 3, the individual factors are represented as the relative risk to a potential purchaser of problems with the vehicle. Each factor could also be individually reported as a percentage representation of the vehicle's likelihood of being on the road in five (5) years based on that factor, or otherwise in line with the overall scores.

Figure 4:
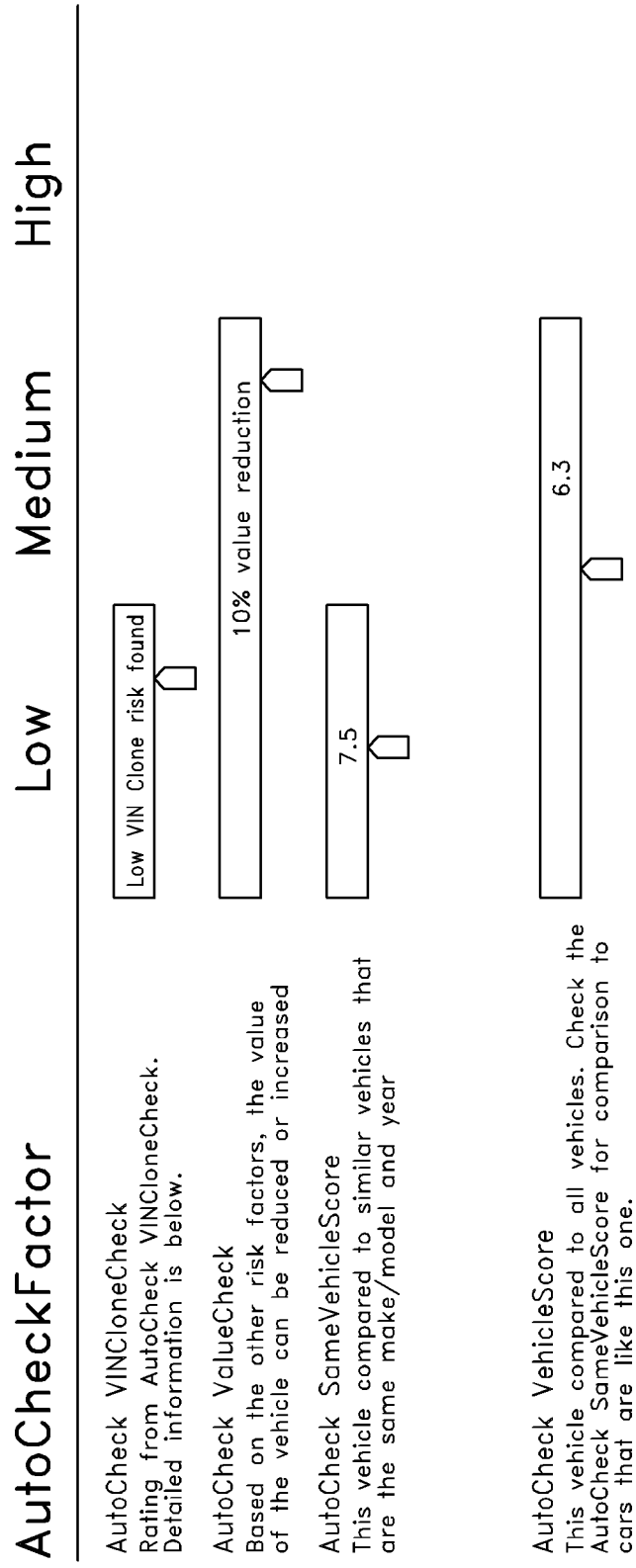
FIG. 4 illustrates a sample output box displaying scores in accordance with an embodiment of the present disclosure.

Returning to FIG. 2, each of the assigned values for the given factors are multiplied by a factor weight through, in an embodiment, a filter layer of module 148 (block 226). This gives the more important factors, as determined by prior modeling, a greater impact on the overall score than less important factors. For example, in an embodiment, if car color is a factor but is determined to have no effect on the likelihood of a vehicle being on the road in five years, the color factor weight would be zero (0) so that it does not impact the results. In an embodiment, mileage may have significant effect on the overall score and thus get a relatively high value, such as eight-tenths (0.8). Block 228 sums the resulting weighted factor values to achieve a final vehicle score. Again, a filter layer may be employed to sum or otherwise combine the various factors. Sample resulting scores for an overall vehicle score and a make/model vehicle score are shown in FIGS. 4 and 6. In FIG. 4, the numerical scores are given as well as a relative risk bar graph. The graphic view may be preferred for quick review, particularly of a single car, and seeing whether or not it is at risk of lasting less than a given number of years and so on. The numerical score, on the other hand, may provide a more accurate way to compare multiple cars that a purchaser is considering.

It is, of course, understood that this is just one method of arriving at a score. The final weighted factor values may be averaged or otherwise combined in other embodiments. In some embodiments, the final weighted factor values may also be used in some of the created filters and not in others. The scale for the score will be well known to be variable by those of skill in the art. One embodiment may produce scores between 0 and 100, another 0 to 10, yet another between 0% and 100%, and so on. Conveying the range of the scale to a user should provide sufficient context for a user to interpret the vehicle scores that are reported. For example, range information may include absolute highest and lowest actual and/or theoretical scores for all vehicles for which an embodiment of the disclosure has information. In an embodiment, a user may be presented a range of some or a majority of the scores of any automobile in the database. One range may include the median 50% of car scores, for example.

Looking to FIG. 6, there is a sample "Summary" output box, such as may be included in a website output to a user. As shown, the "Summary" box may include general information on the specific vehicle, such as its VIN, make, model, class, age, and the like. FIG. 6 also shows an inset box with a vehicle score 630 of "89." A score range 632 for similar vehicles is also shown as "87-91." As stated, this range may indicate that the median 50% of similar vehicles will fall within this score range 632. As such, 25% of vehicles would score below and 25% would score above this range 632. In the example shown, the Nissan 350Z whose VIN was input scores right at the median. It is understood that the range may differ among embodiments. For example, different median percentages, standard deviation calculations, and/or the like may determine the range. The sample shown in FIG. 6 also indicates that "similar vehicles" are generally within a specific range. The definition of similar vehicles may change among various embodiments. For example, age ranges and/or class designations may define the population of "similar vehicles." In another embodiment, for example, similar vehicles may be limited to the same or a set of makes, models, model years, "style/body" designations, and/or the like.

Score Reporting Options

As alluded to above, there are a number of options for presenting a vehicle score to a user, as well as the information, if any, which provides additional context to the score. An embodiment of the disclosed system may comprise or be in communication with a web server. In such an embodiment, a user may access scores by entering a VIN on a website and receiving output such as shown in one or both of FIGS. 4 and 6. A used car listing on the web, such as one provided by a dealer, a classifieds site, or the like, may also provide a link to access a vehicle score of a stored VIN, in addition to or instead of requiring user entry of a VIN.

In various embodiments, the vehicle score may be provided directly to a user through the system or to a user through a third party web site. In an embodiment including a third party web site, there are various options for reporting the score. In one embodiment, the system may output the score in any of a number of formats, such as xml format, for interpretation and inclusion in a web page controlled by the third party. For example, looking to FIG. 6, the third party may control the layout and information included by retrieving the vehicle score 630 from the score generator 102 (FIG. 1) and including it in its own web page layout. In another embodiment, a third party may cede control of a portion of the web page, such as the inset score box or tile 634, to an embodiment of the disclosed system. In such a case, for example, the third party web page may include code, such as an applet, that directs the requesting user system to a web server associated with the disclosed system or the score generator 102 itself to complete the score tile 634. The latter embodiment may be preferable as it can provide additional security and reliability to the score, because it may be more difficult for the third party web site to tamper with the score.

In either case, it is preferred that the look-up and scoring be dynamic, meaning that each time the vehicle score tile 634 is loaded, the scoring of the vehicle is redone by the score generator 102. This helps to ensure that a user is viewing the most accurate score available, based on the most recent data updates regarding the vehicle history of the car for which he or she is seeking a score. Dynamic scoring can also allow increased design flexibility. For example, in an embodiment, users may be able to customize scores based on one or more factors that they consider most important. For example, a user may wish to skew higher scoring toward vehicles driven mostly in rural locations as opposed to urban environments, considering that more important. Additionally, in an embodiment, dynamic scoring allows scoring models to be updated without requiring huge amounts of processing time to rescore all vehicles. Although less preferred, scores may also be retrieved from databases that store the scores calculated on some periodic or random basis, such as daily, weekly, or the like.

Factors

The factors generally will relate to the physical characteristics of the vehicle and/or the history of the vehicle. Any of a number of such attributes may be used in certain embodiments, but factors are likely to be one or more of the following: make, model, year, engine type, equipped options, number of owners, mileage, number of accidents, severity of accidents, length of time retained by each owner, location(s) of primary usage, length of any remaining warranties, maintenance history, type of use (e.g. fleet vehicle, government, rental vehicle, taxi, privately owned, etc.), number of times at auction, emissions test records, major branding events (such as a lemon notification, manufacture buyback, total loss/salvage event, water/flood damage, or negative announcement at auction), odometer branding, odometer rollback modeling, stolen vehicle records, repossession records, and the like. Other factors may include driver education data, whether or not a vehicle was used as crash test vehicles, vehicle safety information, crash test ratings, recall information, and the like. Other embodiments may have additional factors not mentioned here, and factors listed here may not be included in all embodiments.

In an embodiment, some of the factors may be numerical values used in raw form, such as the actual number of owners of a car or the absolute number of accidents in which a car was involved. In an embodiment, some of the factors may be relative numbers, such as a value between one (1) and ten (10), with, for example, ten (10) representing far less mileage than the average vehicle of a given age and one (1) representing far more mileage than an average vehicle of the given age. It should be recognized that some factors may be either actual or relational in various embodiments, such as mileage or the length of time specific owners held the car.

Additionally, some factors may be derived values that are based on non-numeric attributes, amalgamations of various individual attributes, related to different numerical attributes, and the like. For example, a value may be derived based on the relative longevity or brand desire of specific makes (a BMW may get a higher value than a Kia, for example). In an embodiment, individual attributes may be analyzed together to create a single factor value such as for maintenance, which may include both the costs and number of maintenance events. A car's location, based on zip code or other identifier, may be ranked with a high, medium, or low risk value such as for flood prone areas versus high salt areas versus temperate areas, or rural versus urban areas, and the like.

While a number of the possible factors have been enumerated herein, it is understood that not all such factors may be utilized in any given embodiment. It would also be known to one of skill in the art that others not mentioned may be utilized in a similar manner or to approximate some of those factors mentioned herein. The present disclosure is not limited by the specific factors but is defined by the limitations of the claims.

Additionally, one or a subset of factors may be determined to have a more significant effect on a resulting score or affect which other factors should be included for more accurate scoring. In such a case, multiple models may be used for different subsets of the overall vehicle market. For example, it may be determined that the age of the vehicle is a very significant factor in determining its score. Once age is broken out, the number of accidents may be the most significant factor in determining a score of a relatively new car, whereas a much older car may be affected mainly by the brand or quality of production of the older car or the number of owners it has had. It is understood from the disclosure herein then that a score generator 102, in an embodiment, may utilize different "sub-models" to generate scores for different segments of the market or to contribute to the overall model. Such an embodiment, where vehicles in different age categories have different factors and weightings that contribute to each score, is described in more detail below.

Modeling

In order to be able to determine which factors to include and/or which included factors should be weighted most heavily in determining the vehicle scores (such as to create various filter layers for the filter module 146), it may be useful to model the weights of one or more sets of factors to determine the relative correlations of each factor to the ultimate outcome. There are a number of modeling techniques that may be used to determine these weights.

Figure 5:
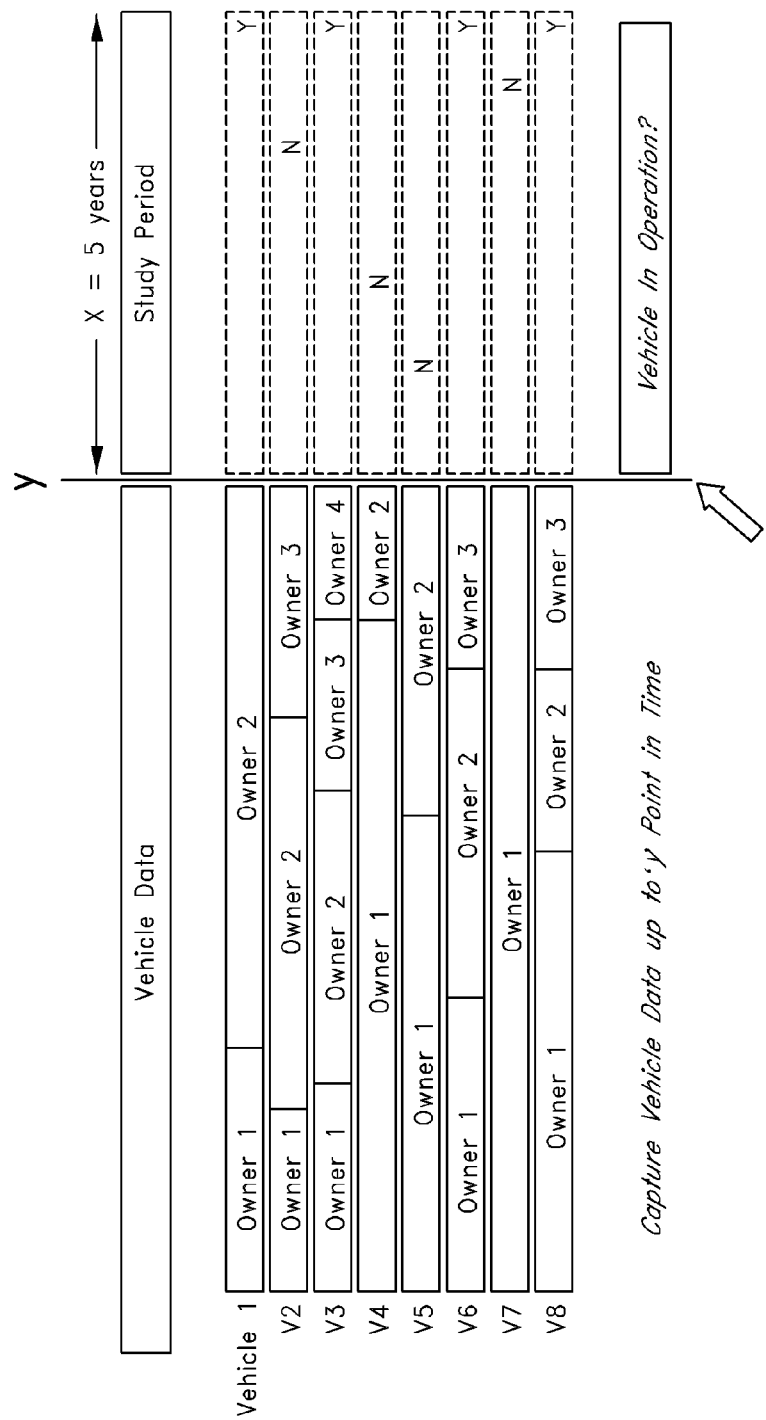
FIG. 5 illustrates a sample of modeling data that may be used in an embodiment of the systems and methods of the present disclosure.

It is generally helpful to gather a study file, in this case a large number of vehicle records, including information on all of the potential factors that are believed might be useful in predicting the scores. To continue the example of a score representing the likelihood of a vehicle still being on the road in five years, it is necessary to include data from both vehicles that remained on the road during a given time period and vehicles that did not. FIG. 5 gives a diagrammatic representation of this. In order to model the likelihood of cars being on the road after five years, a time cutoff Y must be chosen that is at least five years prior to the last data available. The only information relevant after this time period then, in this example, is a binary value of whether or not the vehicle is still on the road. In FIG. 5, Vehicles 1, 3, 6, and 8 were still on the road, and the others had been salvaged, junked, or otherwise reported to be off the road (this may also come from an assumption, such as that the car's registration had lapsed for a certain period of time, such as more than 18 months, based on state registration rules). All the data on the vehicles, prior to the time Y is then potential factor data. Data that may be gathered for this study file includes: the Vehicle In or out of Operation designation; number of owners; odometer reading prior to Y; mileage by owner(s); VIN Detail—make, model, year, engine size, country of manufacture, performance options, number off the line, etc.; brands prior to Y, meaning adverse events registered by a state (such as lemon designations, manufacturer buybacks, salvage yard notices, negative announcements at auction); Geography—MSA (metropolitan statistics area)/state/zip/latitude/longitude/etc. by owner; number of months retained by owner(s); number of accidents reported before Y; number of times at auctions prior to Y; any indication of odometer rollback (this may be a calculated value); MSRP Value at Y, at time of retail, and/or at other specific other times; number of times failed emissions; purchase type by owner (such as whether use would be for fleet/government/lease/individual ownership/etc.).

Initial weights for each factor may be assigned at random or may represent estimations. Changing the weight of the various factors may then result in better or worse models. Such modeling may be done by a number of well-known methods such as through the use of neural networks, logistic regression and the like. The approach may also be hands-on with statisticians or others aiding the modeling process or automated, such as with back propagation in a neural network to improve modeling.

Details of an Embodiment

The following is a description of an embodiment of a vehicle scoring model, according to the present disclosure, including coding specifications. As can be seen, this embodiment utilizes multiple models for different vehicle age categories. In this embodiment, the models were built to estimate the likelihood that a vehicle will be on the road in 5 years. The probability created by these models is the score for this embodiment.

The following outlines a detailed procedure for implementing one embodiment of the present disclosure, titled AutoCheck Vehicle score. This model should be applied to each vehicle based upon the age of the vehicle and only those vehicles with event history information. Separate models were developed for six mutually exclusive age groups, namely 0-3 years; 4-5 years; 6-8 years; 9-10 years; 11-12 years; and 13+ years. The following disclosure includes details of an example process for obtaining a score, based on the testing of a large sample set of data by Experian, the assignees of the present disclosure. It is important to recognize that this section is describing one embodiment only, and it will be easily understood from the teachings herein how other factors, weighting, combinations thereof, and the like can be used in a myriad of ways to create other embodiments in keeping with these teachings.

Utilizing standard modeling techniques as discussed above, it was determined that a number of input variables were of value. Variables taken from the database(s) records may be identified as "primary factors." In this embodiment, they include the make and model year of the vehicle. The manufacturers suggested retail price ("MSRP") of the vehicle and the value of loan are also utilized; this information may be obtained from publicly available sources such as Black Book, available from National Auto Research. In this embodiment, a vehicle class as designated by Automotive News, a well-known automotive industry publication, is a factor. Whether or not a vehicle is AutoCheck® Assured® is another factor. AutoCheck® Assurance is a service publicly available from Experian, the assignees of the present disclosure, at www.autocheck.com. It takes into account factors such as title branding, theft, water damage, auction branding, and the like. The total number of owners is another factor, and for each owner, state and zip location factors are utilized. Additionally, odometer readings throughout the life of the vehicle and various events in the history of a car, as well as the timing of each event, are recorded as factors. It is to be understood that any number of events may be recorded and utilized, and preferably all recorded events in a vehicle's history are factored into the score. Events in this example include emissions checks, use of the vehicle by the government, specific use by police, accident, theft, and repossession occurrences, and whether the vehicle was used as a taxi or limousine. Similarly data on each of multiple owners may be used. The input variables are listed in Table 1 and specific event variable codes are listed in Table 2.

TABLE 1

| INPUT VARIABLES | |
|---|---|
| Variable | Description |
| VEHICLE DATA | |
| MODELYR | Model Year of Vehicle |
| VALMSRP | Value of MSRP |
| VALLOAN | Value of Loan |
| MAKETXT | Make Text of Vehicle |
| VEHCLASS | Vehicle Class |
| HASSURED | AutoCheck Assured |
| TOTOWN1 | Total Number of Owners |
| OWNER #1 | |
| STATE1 | State of Current Owner |
| ZIPLOC1 | Zip Locality of Current Owner |
| OWNER FILE | |
| LEASE01 | Lease Flag - Owner #1 |
| LEASE02 | Lease Flag - Owner #2 |
| LEASE03 | Lease Flag - Owner #3 |
| LEASE04 | Lease Flag - Owner #4 |
| LEASE05 | Lease Flag - Owner #5 |
| LEASE06 | Lease Flag - Owner #6 |
| LEASE07 | Lease Flag - Owner #7 |
| LEASE08 | Lease Flag - Owner #8 |
| LEASE09 | Lease Flag - Owner #9 |
| LEASE10 | Lease Flag - Owner #10 |
| EVENT HISTORY DATA | |
| EODO1 | Odometer Reading - Event #1 |
| EODO2 | Odometer Reading - Event #2 |
| EODO3 | Odometer Reading - Event #3 |
| EODO4 | Odometer Reading - Event #4 |
| EODO5 | Odometer Reading - Event #5 |
| EODO6 | Odometer Reading - Event #6 |
| EODO7 | Odometer Reading - Event #7 |
| EODO8 | Odometer Reading - Event #8 |
| EODO9 | Odometer Reading - Event #9 |
| EODO10 | Odometer Reading - Event #10 |
| EDATYR1 | Event Year - Event #1 |
| EDATYR2 | Event Year - Event #2 |
| EDATYR3 | Event Year - Event #3 |
| EDATYR4 | Event Year - Event #4 |
| EDATYR5 | Event Year - Event #5 |
| EDATYR6 | Event Year - Event #6 |
| EDATYR7 | Event Year - Event #7 |
| EDATYR8 | Event Year - Event #8 |
| EDATYR9 | Event Year - Event #9 |
| EDATYR10 | Event Year - Event #10 |
| EDATMT1 | Event Month - Event #1 |
| EDATMT2 | Event Month - Event #2 |
| EDATMT3 | Event Month - Event #3 |
| EDATMT4 | Event Month - Event #4 |
| EDATMT5 | Event Month - Event #5 |
| EDATMT6 | Event Month - Event #6 |
| EDATMT7 | Event Month - Event #7 |
| EDATMT8 | Event Month - Event #8 |
| EDATMT9 | Event Month - Event #9 |
| EDATMT10 | Event Month - Event #10 |
| ECHEK01 | Event Checklist - Event #1 (leased, repossessed, etc.) |
| ECHEK02 | Event Checklist - Event #2 |
| ECHEK03 | Event Checklist - Event #3 |
| ECHEK04 | Event Checklist - Event #4 |
| ECHEK05 | Event Checklist - Event #5 |
| ECHEK06 | Event Checklist - Event #6 |
| ECHEK07 | Event Checklist - Event #7 |
| ECHEK08 | Event Checklist - Event #8 |
| ECHEK09 | Event Checklist - Event #9 |
| ECHEK10 | Event Checklist - Event #10 |

TABLE 2

EVENT VARIABLES

| | |
|---|---|
| EMISSION | Vehicle has gone through an emission inspection, defined by ECHEK01 through ECHEK30 = '3030' |
| GOVUSE | Vehicle was used by a government agency defined by ECHEK01 through ECHEK30 = '5030' |
| POLICE | Vehicle was used by a police agency defined by ECHEK01 through ECHEK30 = '5040' |
| ACCIDENT | Accident records were found for the Vehicle, defined by ECHEK01 through ECHEK30 = '3000' |
| THEFT | Vehicle was stolen, Insurance claim filed, Auction announced as stolen, etc. defined by ECHEK01 through ECHEK30 = '3090' |
| REPOSS | Repossessed Vehicle defined by ECHEK01 through ECHEK30 = '5080' |
| TAXI | Vehicle is or was used as a taxi, defined by ECHEK01 through ECHEK30 = '5050' |
| LIVERY | Vehicle is "for hire" to transport people, defined by ECHEK01 through ECHEK30 = '5020' |

Additional factors may be derived through the use of these primary factors. The derived factors, as in this example embodiment, can include the age of the vehicle, maximum mileage, date of last mileage reading, time since that mileage reading, estimated mileage since last reading, estimated total mileage, the MSRP ratio, and whether or not a vehicle has been leased, and are described in Table 3.

TABLE 3

VARIABLES TO CREATE FOR MODELS

| | |
|---|---|
| CURRYR | Current Year |
| CURRMTH | Current Month |
| AGE | Age of Vehicle |
| MAXEMILE | Maximum Mileage based upon Odometer reading |
| MAXEYR | Event Year associated with Maximum Odometer reading |
| MAXEMTH | Event Month associate with Maximum Odometer reading |
| NOM | Number of Months for Mileage Update |
| UPMILES | Monthly miles to update |
| FINMILE | Sum of Maximum Odometer reading and Updated miles (UPMILES * NOM) |
| MSRP RATIO | Value of Loan/Value of MSRP |
| LEASE | Defined by LEASE01 through LEASE10 = 'Y' |

As can be seen from Table 3, an algorithm may be used to estimate the number of miles since the last reported mileage event. The following algorithm details a process for estimating mileage in cases where time has elapsed between the last recorded odometer reading and the present (or the time for which a score is desired). In this embodiment, the estimation is based on the state and zip codes where the car is registered, and, presumptively, most used. It has been determined that the location of use may provide a relatively good approximation of the mileage driven over certain periods of time.

Below are descriptions and coding specifications for creating the table to update AutoCheck mileage based upon the Event History data. The mileage is updated based on each event reported that has a corresponding odometer/mileage reading. The state and ZIP Code where the event occurred, as well as ZIPLOC, a Zip locality variable, are used in the update process.

First, a sample set of VINs is used and event information is gathered for each VIN. Each event with an odometer reading greater than zero is sorted by date. Each VIN then gets a counter variable for the number of qualifying odometer events.

A number of variables are then created, including CURRYR, the current year, and CURRMTH, the current month. Each event then gets a count of the number of months from the event to the current month (NOM1=(CURRYR−EVENT DATE YEAR−1)*12+(CURRMTH+12−EVENT DATE MONTH). Additionally, the number of miles for each event is then calculated (EVENT_MILES is the Odometer reading for the next future listed event minus the Odometer reading for the current event). The number of months (NOM) between events is also then similarly calculated. This data is used to create an average number of miles per month for each event (If NOM greater than 0, MILEMTH=ROUND (EVENT_MILE/NOM)).

If information on the State for the event is unavailable, STATE="00." The ZIPLOC variable is also recoded as follows:

If ZIPLOC equals 'B2' then ZIPLOC=1 [business]
If ZIPLOC equals 'C1', 'C2', 'C3', 'C4' then set ZIPLOC=2 [city]
If ZIPLOC equals 'R0', 'R1', 'R2', 'R3', 'R4' then set ZIPLOC=3 [rural]
If ZIPLOC equals 'R5', 'R6', 'R7', 'R8', 'R9' then set ZIPLOC=4
If ZIPLOC equals 'S0', 'S1', 'S2', 'S3', 'S4' then set ZIPLOC=5 [suburban]
If ZIPLOC equals 'S5', 'S6', 'S7', 'S8', 'S9' then set ZIPLOC=6
Else set ZIPLOC=7

Finally a lookup table is created. In an embodiment, this is based on a set number of general rules. The updated mileage table should be based upon the last six years. Older events should be factored out. Calculate the average miles per month for each STATE and ZIP LOCALITY combined as well as each State. Evaluate the sample size for each STATE and ZIP LOCALITY. If the sample size is less than 100, then replace average using a similar state. For example, cars in North Dakota in Business (B2) Zip Codes might be replaced with the average monthly miles for vehicles in South Dakota with Business Zip Codes. Replace all missing Zip Localities (those coded to the value '7') with the average monthly miles for the state.

Based upon the most recent owner's State and Zip Locality, the update mileage variable (FINMILES) can then be determined from the table (FINMILES=NOM*UPMILES+MAXEMILES). Table 4 is an example of the table used.

TABLE 4

UPDATE MILEAGE LOOK-UP TABLE

| State | Zip Locality | Final Miles |
|---|---|---|
| Missing | 1 | 1483.12 |
| Missing | 2 | 5020.58 |
| Missing | 3 | 4275.67 |
| Missing | 4 | 1483.12 |
| Missing | 5 | 3604.38 |
| Missing | 6 | 1483.12 |
| Missing | 7 | 1377.39 |
| AA | 2 | 1483.12 |
| AA | 7 | 1483.12 |
| AB | 7 | 1483.12 |
| AE | 7 | 1483.12 |
| AK | 1 | 1311.42 |
| AK | 2 | 1232.92 |
| AK | 3 | 1092.14 |
| AK | 4 | 1225.94 |
| AK | 5 | 1086.66 |
| AK | 6 | 1573.99 |

TABLE 4-continued

UPDATE MILEAGE LOOK-UP TABLE

| State | Zip Locality | Final Miles |
|---|---|---|
| AK | 7 | 1048.88 |
| AL | 1 | 1582.03 |
| AL | 2 | 1796.36 |
| AL | 3 | 1845.35 |
| AL | 4 | 1920.83 |
| AL | 5 | 1848.28 |
| AL | 6 | 1907.61 |
| AL | 7 | 1768.34 |
| AP | 7 | 1483.12 |
| AR | 1 | 2169.12 |
| AR | 2 | 2106.40 |
| AR | 3 | 2024.48 |
| AR | 4 | 2272.49 |
| AR | 5 | 2518.71 |
| AR | 6 | 2198.32 |
| AR | 7 | 2094.09 |
| AZ | 1 | 2082.01 |
| AZ | 2 | 1579.05 |
| AZ | 3 | 1360.49 |
| AZ | 4 | 1776.14 |
| AZ | 5 | 1504.59 |
| AZ | 6 | 1804.62 |
| AZ | 7 | 1771.60 |
| CA | 1 | 1554.46 |
| CA | 2 | 1748.52 |
| CA | 3 | 1411.67 |
| CA | 4 | 2077.00 |
| CA | 5 | 1546.35 |
| CA | 6 | 1587.49 |
| CA | 7 | 1226.67 |
| CO | 1 | 1541.59 |
| CO | 2 | 1880.47 |
| CO | 3 | 2025.40 |
| CO | 4 | 2160.06 |
| CO | 5 | 1648.34 |
| CO | 6 | 2322.54 |
| CO | 7 | 1728.68 |
| CT | 1 | 1246.95 |
| CT | 2 | 1312.29 |
| CT | 3 | 1456.99 |
| CT | 4 | 1422.18 |
| CT | 5 | 1343.64 |
| CT | 6 | 1379.56 |
| CT | 7 | 1460.49 |
| DC | 1 | 1475.79 |
| DC | 2 | 3513.60 |
| DC | 4 | 2192.27 |
| DC | 5 | 1689.88 |
| DC | 6 | 1956.93 |
| DC | 7 | 1678.53 |
| DE | 1 | 1963.05 |
| DE | 2 | 1756.44 |
| DE | 3 | 1776.50 |
| DE | 4 | 1800.10 |
| DE | 5 | 1989.94 |
| DE | 6 | 1611.47 |
| DE | 7 | 2062.76 |
| FL | 1 | 1400.08 |
| FL | 2 | 1451.88 |
| FL | 3 | 1886.91 |
| FL | 4 | 1541.97 |
| FL | 5 | 1491.59 |
| FL | 6 | 1538.05 |
| FL | 7 | 1529.43 |
| GA | 1 | 2426.22 |
| GA | 2 | 2048.94 |
| GA | 3 | 2092.61 |
| GA | 4 | 2472.52 |
| GA | 5 | 2059.61 |
| GA | 6 | 2079.48 |
| GA | 7 | 1885.64 |
| GU | 7 | 1483.12 |
| HI | 1 | 1673.82 |
| HI | 2 | 1283.69 |
| HI | 3 | 1321.29 |
| HI | 4 | 1848.58 |
| HI | 5 | 1649.42 |
| HI | 6 | 1464.42 |
| HI | 7 | 1464.42 |
| IA | 1 | 1823.26 |
| IA | 2 | 1241.00 |
| IA | 3 | 1165.85 |
| IA | 4 | 1479.03 |
| IA | 5 | 1343.85 |
| IA | 6 | 1434.76 |
| IA | 7 | 1301.97 |
| ID | 1 | 956.95 |
| ID | 2 | 1688.02 |
| ID | 3 | 2504.72 |
| ID | 4 | 2510.55 |
| ID | 5 | 1392.08 |
| ID | 6 | 2230.52 |
| ID | 7 | 1315.32 |
| IL | 1 | 2322.06 |
| IL | 2 | 1521.42 |
| IL | 3 | 1533.54 |
| IL | 4 | 1993.73 |
| IL | 5 | 1478.86 |
| IL | 6 | 1835.36 |
| IL | 7 | 1522.20 |
| IN | 1 | 1042.08 |
| IN | 2 | 1241.58 |
| IN | 3 | 1298.56 |
| IN | 4 | 1580.42 |
| IN | 5 | 1512.47 |
| IN | 6 | 1582.15 |
| IN | 7 | 1391.91 |
| KS | 1 | 1330.02 |
| KS | 2 | 2132.75 |
| KS | 3 | 1699.21 |
| KS | 4 | 2066.43 |
| KS | 5 | 1837.87 |
| KS | 6 | 2663.32 |
| KS | 7 | 1910.31 |
| KY | 1 | 1996.76 |
| KY | 2 | 2339.08 |
| KY | 3 | 1993.62 |
| KY | 4 | 2712.68 |
| KY | 5 | 2437.63 |
| KY | 6 | 2567.52 |
| KY | 7 | 2261.82 |
| LA | 1 | 1559.27 |
| LA | 2 | 1675.22 |
| LA | 3 | 1731.62 |
| LA | 4 | 1817.26 |
| LA | 5 | 1587.92 |
| LA | 6 | 2051.50 |
| LA | 7 | 1666.98 |
| MA | 1 | 1335.57 |
| MA | 2 | 1619.84 |
| MA | 3 | 1404.43 |
| MA | 4 | 1389.55 |
| MA | 5 | 1377.12 |
| MA | 6 | 1543.68 |
| MA | 7 | 1610.56 |
| MD | 1 | 1963.05 |
| MD | 2 | 2684.51 |
| MD | 3 | 2686.33 |
| MD | 4 | 2997.66 |
| MD | 5 | 2700.78 |
| MD | 6 | 2829.75 |
| MD | 7 | 2558.74 |
| ME | 1 | 1418.26 |
| ME | 2 | 1563.93 |
| ME | 3 | 2347.69 |
| ME | 4 | 2694.69 |
| ME | 5 | 2426.83 |
| ME | 6 | 2304.48 |
| ME | 7 | 2153.56 |
| MI | 1 | 1117.48 |
| MI | 2 | 1305.62 |
| MI | 3 | 1196.14 |

TABLE 4-continued

UPDATE MILEAGE LOOK-UP TABLE

| State | Zip Locality | Final Miles |
|---|---|---|
| MI | 4 | 1435.20 |
| MI | 5 | 1230.84 |
| MI | 6 | 1360.35 |
| MI | 7 | 1227.71 |
| MN | 1 | 1613.47 |
| MN | 2 | 1652.03 |
| MN | 3 | 1470.40 |
| MN | 4 | 1865.70 |
| MN | 5 | 1463.86 |
| MN | 6 | 1640.23 |
| MN | 7 | 1318.35 |
| MO | 1 | 1539.53 |
| MO | 2 | 1745.38 |
| MO | 3 | 1939.02 |
| MO | 4 | 1956.37 |
| MO | 5 | 1807.58 |
| MO | 6 | 1823.52 |
| MO | 7 | 1724.75 |
| MP | 7 | 1483.12 |
| MS | 1 | 1559.27 |
| MS | 2 | 1704.64 |
| MS | 3 | 2008.57 |
| MS | 4 | 2346.50 |
| MS | 5 | 2058.47 |
| MS | 6 | 2151.04 |
| MS | 7 | 2068.00 |
| MT | 1 | 956.95 |
| MT | 2 | 1282.64 |
| MT | 3 | 1208.02 |
| MT | 4 | 1596.97 |
| MT | 5 | 1392.08 |
| MT | 6 | 2230.52 |
| MT | 7 | 1630.64 |
| NC | 1 | 1574.96 |
| NC | 2 | 1621.88 |
| NC | 3 | 1625.27 |
| NC | 4 | 1558.11 |
| NC | 5 | 1575.37 |
| NC | 6 | 1683.43 |
| NC | 7 | 1409.02 |
| ND | 1 | 1515.62 |
| ND | 2 | 1415.50 |
| ND | 3 | 1149.02 |
| ND | 4 | 1679.84 |
| ND | 5 | 1438.63 |
| ND | 6 | 1432.23 |
| ND | 7 | 1456.36 |
| NE | 1 | 1269.73 |
| NE | 2 | 1087.68 |
| NE | 3 | 1079.27 |
| NE | 4 | 1333.34 |
| NE | 5 | 1348.08 |
| NE | 6 | 1288.48 |
| NE | 7 | 1149.58 |
| NH | 1 | 1418.26 |
| NH | 2 | 1348.63 |
| NH | 3 | 1463.91 |
| NH | 4 | 1583.05 |
| NH | 5 | 1436.37 |
| NH | 6 | 1638.45 |
| NH | 7 | 1466.55 |
| NJ | 1 | 1296.28 |
| NJ | 2 | 1573.06 |
| NJ | 3 | 1888.12 |
| NJ | 4 | 2001.17 |
| NJ | 5 | 1191.23 |
| NJ | 6 | 1332.83 |
| NJ | 7 | 1260.33 |
| NM | 1 | 2943.53 |
| NM | 2 | 1951.06 |
| NM | 3 | 1834.20 |
| NM | 4 | 2980.27 |
| NM | 5 | 2368.07 |
| NM | 6 | 2875.31 |
| NM | 7 | 1752.88 |
| NV | 1 | 1380.88 |
| NV | 2 | 1433.45 |
| NV | 3 | 1360.49 |
| NV | 4 | 1776.14 |
| NV | 5 | 1369.45 |
| NV | 6 | 1804.62 |
| NV | 7 | 1220.30 |
| NY | 1 | 1385.56 |
| NY | 2 | 1822.65 |
| NY | 3 | 1888.12 |
| NY | 4 | 2001.17 |
| NY | 5 | 1616.29 |
| NY | 6 | 1773.74 |
| NY | 7 | 1616.57 |
| OH | 1 | 1303.60 |
| OH | 2 | 1426.96 |
| OH | 3 | 1168.74 |
| OH | 4 | 2011.73 |
| OH | 5 | 1243.44 |
| OH | 6 | 1937.37 |
| OH | 7 | 1372.57 |
| OK | 1 | 2112.93 |
| OK | 2 | 1970.50 |
| OK | 3 | 1583.15 |
| OK | 4 | 2142.48 |
| OK | 5 | 2134.95 |
| OK | 6 | 2666.83 |
| OK | 7 | 1941.04 |
| ON | 7 | 1483.12 |
| OR | 1 | 1290.17 |
| OR | 2 | 1401.47 |
| OR | 3 | 1575.53 |
| OR | 4 | 1670.23 |
| OR | 5 | 1439.28 |
| OR | 6 | 1423.45 |
| OR | 7 | 1544.29 |
| PA | 1 | 1818.83 |
| PA | 2 | 1422.47 |
| PA | 3 | 1379.61 |
| PA | 4 | 1566.14 |
| PA | 5 | 1476.00 |
| PA | 6 | 1568.76 |
| PA | 7 | 1338.45 |
| PR | 3 | 1483.12 |
| PR | 7 | 1483.12 |
| RI | 1 | 1483.12 |
| RI | 2 | 1483.12 |
| RI | 5 | 1483.12 |
| RI | 6 | 1483.12 |
| RI | 7 | 1379.00 |
| SC | 1 | 3105.56 |
| SC | 2 | 2543.41 |
| SC | 3 | 2527.49 |
| SC | 4 | 2425.91 |
| SC | 5 | 2573.69 |
| SC | 6 | 2730.64 |
| SC | 7 | 2458.53 |
| SD | 1 | 1203.13 |
| SD | 2 | 1157.69 |
| SD | 3 | 1203.30 |
| SD | 4 | 1563.26 |
| SD | 5 | 1474.27 |
| SD | 6 | 1432.23 |
| SD | 7 | 1249.04 |
| TN | 1 | 1675.55 |
| TN | 2 | 1785.01 |
| TN | 3 | 1660.02 |
| TN | 4 | 1723.65 |
| TN | 5 | 1818.94 |
| TN | 6 | 1965.45 |
| TN | 7 | 1696.79 |
| TX | 1 | 1642.74 |
| TX | 2 | 1766.24 |
| TX | 3 | 1619.07 |
| TX | 4 | 1954.60 |
| TX | 5 | 1738.27 |
| TX | 6 | 1831.68 |

TABLE 4-continued

UPDATE MILEAGE LOOK-UP TABLE

| State | Zip Locality | Final Miles |
|---|---|---|
| TX | 7 | 1500.61 |
| UT | 1 | 1541.59 |
| UT | 2 | 2280.45 |
| UT | 3 | 2025.40 |
| UT | 4 | 2160.06 |
| UT | 5 | 2194.22 |
| UT | 6 | 2322.54 |
| UT | 7 | 1580.50 |
| VA | 1 | 1475.79 |
| VA | 2 | 1792.64 |
| VA | 3 | 1954.60 |
| VA | 4 | 2192.27 |
| VA | 5 | 1689.88 |
| VA | 6 | 1956.93 |
| VA | 7 | 1678.53 |
| VT | 1 | 1418.26 |
| VT | 2 | 1348.63 |
| VT | 3 | 2626.03 |
| VT | 4 | 2575.36 |
| VT | 5 | 1436.37 |
| VT | 6 | 1638.45 |
| VT | 7 | 2066.08 |
| WA | 1 | 1290.17 |
| WA | 2 | 1401.47 |
| WA | 3 | 1575.53 |
| WA | 4 | 1462.90 |
| WA | 5 | 1439.28 |
| WA | 6 | 1423.45 |
| WA | 7 | 1307.38 |
| WI | 1 | 1050.09 |
| WI | 2 | 2105.45 |
| WI | 3 | 1807.89 |
| WI | 4 | 1763.28 |
| WI | 5 | 1585.15 |
| WI | 6 | 2034.03 |
| WI | 7 | 1610.20 |
| WV | 1 | 2756.06 |
| WV | 2 | 1479.96 |
| WV | 3 | 1884.93 |
| WV | 4 | 1670.23 |
| WV | 5 | 1603.53 |
| WV | 6 | 1802.25 |
| WV | 7 | 1728.80 |
| WY | 1 | 1670.87 |
| WY | 2 | 1354.22 |
| WY | 3 | 1577.46 |
| WY | 4 | 2000.25 |
| WY | 5 | 1474.27 |
| WY | 6 | 1432.23 |
| WY | 7 | 1547.65 |
| Missing | Missing | 1483.12 |

The other derived variables created are the Current Year (CURRYR) and Current Month (CURRMTH), as well as an automobiles age (AGE=CURRYR−MODELYR). Due to the fact that, in some embodiments, model years do not necessarily coincide exactly with calendar years, if the above calculation of AGE equals −1, the AGE is set to 0, and if the AGE equals CURRYR (the model year is missing or unknown for some reason), then the earliest year available from the event history is used as a proxy for MODELYR, and AGE is recalculated. As described above, in the example embodiment, six age categories (designated by AGE1) are used:

If AGE is greater than or equal to 0 and less than or equal to 3 then set AGE1=1

If AGE is greater than or equal to 4 and less than or equal to 5 then set AGE1=2

If AGE is greater than or equal to 6 and less than or equal to 8 then set AGE1=3

If AGE is greater than or equal to 9 and less than or equal to 10 then set AGE1=4

If AGE is greater than or equal to 11 and less than or equal to 12 then set AGE1=5

If AGE is greater than or equal to 13 then set AGE1=6

ZIPLOC is set based on the current owner's zip locality:

---

If ZIPLOC1 equals 'B2' then set ZIPLOC=1
If ZIPLOC1 equals 'C1', 'C2', 'C3', 'C4' then set ZIPLOC=2
If ZIPLOC1 equals 'R0', 'R1', 'R2', 'R3', 'R4' then set ZIPLOC=3
If ZIPLOC1 equals 'R5', 'R6', 'R7', 'R8', 'R9' then set ZIPLOC=4
If ZIPLOC1 equals 'S0', 'S1', 'S2', 'S3', 'S4' then set ZIPLOC=5
If ZIPLOC1 equals 'S5', 'S6', 'S7', 'S8', 'S9' then set ZIPLOC=6
Else set ZIPLOC=7

---

If the current owner's state is missing, STATE is coded to '00.' The maximum miles can be computed as the maximum of all event odometer readings. The corresponding event year (MAXEYR) and event month (MAXEMTH) of the maximum odometer reading should be passed to two new variables. Using STATE1 and ZIPLOC1, the table discussed above can give the value of UPMILES. Finally, if VALLOAN is greater than 0 AND VALMSRP is greater than 0, then MSRPRAT=VALLOAN/VALMSRP. Once these variables are known, the automobile or automobiles being scored can be filtered into the correct age groups, and scored as below:

---

1. SEGMENT 1: Age 0-3 Years
   Select if AGE1=1
   Recode and point assignment to FINMILE:
   If AGE = 0 and FINMILE is blank then set FINMILE=14510.17
   If AGE = 1 and FINMILE is blank then set FINMILE=29565.12
   If AGE = 2 and FINMILE is blank then set FINMILE=48072.77
   If AGE = 3 and FINMILE is blank then set FINMILE=64491.77
   Compute FINMILE=FINMILE*−0.000005
   Point assignment to TOTOWN1:
   Compute TOTOWN1=TOTOWN1 * −0.0894
   Recode and point assignment to HASSURED: autocheck assured
   If HASSURED = 'Y' then set HASSURED = 0.4319
   Else set HASSURED = −0.4319
   Recode and point assignment to NEGA1: (government use, police use, accident, theft)
   Count GOVUSE = ECHEK01 to ECHEK30 ('5030')
   Count POLICE = ECHEK01 to ECHEK30 ('5040')
   Count ACCIDENT=ECHEK01 to ECHEK30 ('3000')
   Count THEFT=ECHEK01 to ECHEK30 ('3090')
   Recode GOVUSE POLICE ACCIDENT THEFT (1 thru hi=1).

-continued

If GOVUSE, POLICE, ACCIDENT or THEFT = 1 then set NEGA1=−0.4216
Else set NEGA1= 0.4216
Recode and point assignment to MAKETXT:
If MAKETXT = 'Aston Martin', 'Ferrari', 'Lotus', 'Hummer', 'BMW', 'Mini', 'Jaguar', 'Subaru', 'Rolls Royce', 'Bentley', 'Lexus', 'Lamborghini'
    then set MAKETXT = 0.2622
If MAKETXT = 'Infiniti', 'Mercedes-Benz', 'Cadillac', 'Buick', 'Volvo', 'Porsche', 'Saab'
    then set MAKETXT = 0.2243
If MAKETXT = 'Audi', 'Acura', 'Toyota', 'Scion', 'Lincoln', 'Honda', 'Chrysler', 'Volkswagen', 'Jeep', 'Land Rover'
    then set MAKETXT = 0.1613
If MAKETXT = 'Nissan', 'GMC', 'Oldsmobile', 'Chevrolet', 'Saturn', 'Pontiac', 'Dodge', 'Dodge Freightliner', 'Freightliner', 'Ford', 'Mercury'
    then set MAKETXT = −0.0022
If MAKETXT = 'Mazda', 'Isuzu', 'Mitsubishi', 'Plymouth', 'Hyundai'
    then set MAKETXT = −0.2109
If MAKETXT = 'Kia', 'Daewoo', 'Suzuki', 'Eagle'
    then set MAKETXT = −0.4347
If MAKETXT is blanks then set MAKETXT = −0.0022
Recode and point assignment to VEHCLASS:
If VEHCLASS = 'Sport Car - Ultra Luxury', 'Sport Wagon - Mid Range', 'Sport Car - Premium', 'Upscale - Premium', 'Upscale - Near Luxury' 'Upscale - Luxury', 'Sport Car - Upper Premium', 'SUV - Large', 'SUV - Upper Mid Range', 'Mid Range Car - Premium'
    then set VEHCLASS = 0.3441
If VEHCLASS = 'SUV - Pickup', 'SUV - Lower Mid Range', 'CUV - Mid Range', 'Van - Mini', 'Pickup - Full Sized', 'Mid Range Car - Standard', 'SUV - Premium Large', 'CUV - Premium', 'Sport Wagon - Premium', 'Upscale - Ultra', 'Sport Wagon - Entry Level', 'Alt Power - Hybrid Car', 'SUV - Entry Level', 'CUV - Entry Level', 'Pickup - Small'
    then set VEHCLASS = 0.1067
If VEHCLASS = 'Mid Range Car - Lower', 'Van - Full Sized', 'Sport Car - Touring'
    then set VEHCLASS = −0.1285
If VEHCLASS = 'Traditional Car', 'Small Car - Economy', 'Small Car - Budget'
    then set VEHCLASS = −0.3223
If VEHCLASS is blank then set VEHCLASS = 0.1067
Creation of SCORE for Vehicles 0 - 3 Years Old:
SCORE = (1.7137 + FINMILE + TOTOWN1 + HASSURED + NEGA1 + MAKETXT + VEHCLASS)

2. SEGMENT 2: Age 4-5 Years
Select if AGE1=2
Recode and point assignment to MSRPRAT:
If AGE = 4 and MSRPRAT is blank then set MSRPRAT=0.4771
If AGE = 5 and MSRPRAT is blank then set MSRPRAT=0.3901
Compute MSRPRAT=MSRPRAT*1.0794
Recode and point assignment to FINMILE:
If AGE = 4 and FINMILE is blank then set FINMILE=80945.76
If AGE = 5 and FINMILE is blank then set FINMILE=96516.11
Compute FINMILE=FINMILE* −0.000006
Point assignment to TOTOWN1:
Compute TOTOWN1=TOTOWN1 * −0.1191
Recode and point assignment to HASSURED:
If HASSURED equals 'Y' then set HASSURED = 0.2872
Else set HASSURED equal to −0.2872
Create and point assignment to POS1:
Count LEASE = LEASE01 to LEASE10 ('Y')
Count EMISSION = ECHEK01 to ECHEK30 ('3030')
Recode LEASE EMISSION (1 thru hi=1)
If LEASE or EMISSION equals 1 then set then set POS1 = 0.0455
Else set POS1 = −0.0455
Create and point assignment to NEGB1:
Count ACCIDENT=ECHEK01 to ECHEK30 ('3000')
Count THEFT=ECHEK01 to ECHEK30 ('3090')
Count REPOSS=ECHEK01 to ECHEK30 ('5080')
Count TAXI=ECHEK01 to ECHEK30 ('5050')
Recode ACCIDENT THEFT REPOSS TAXI (1 thru hi=1)
If ACCIDENT, THEFT, REPOSS or TAXI = 1 then set NEGB1 = −0.1591
Else set NEGB1 = 0.1591
Recode and point assignment to MAKETXT:
If MAKETXT = 'Lotus', 'Rolls Royce', 'BMW', 'Mini', 'Ferrari', 'Volvo', 'Mercedes-Benz', 'Bentley', 'Lexus', 'Subaru'
    then set MAKETXT = 0.2640
If MAKETXT = 'Jaguar', 'Porsche', 'GMC', 'Audi', 'Lincoln', 'Saab', 'Cadillac', 'Buick'
    then set MAKETXT = 0.1283
If MAKETXT = 'Jeep', 'Honda', 'Infiniti', 'Acura', 'Toyota', 'Scion', 'Land Rover'
    then set MAKETXT = 0.1022
If MAKETXT = 'Chevrolet', 'Hummer', 'Ford', 'Oldsmobile', 'Isuzu', 'Chrysler', 'Volkswagen', 'Dodge', 'Dodge Freightliner', 'Freightliner', 'Saturn' then set MAKETXT = −0.0764
If MAKETXT = 'Nissan', 'Mercury', 'Mazda', 'Pontiac', 'Mitsubishi', 'Plymouth'
    then set MAKETXT = −0.1417
If MAKETXT = 'Daewoo', 'Eagle', 'Geo', 'Kia', 'Suzuki', 'Hyundai'
    then set MAKETXT = −0.2764
If MAKETXT = blank then set MAKETXT = 0.1022
Recode and point assignment to VEHCLASS:
If VEHCLASS = 'Alt Power - Hybrid Car', 'Alt Power - Hybrid Truck', 'Sport Car - Ultra Luxury', 'Sport Car - Upper Premium'
    then set VEHCLASS = 0.7330
If VEHCLASS = 'Upscale - Premium', 'Pickup - Full Sized', 'SUV - Large', 'Upscale - Luxury', 'Upscale - Near Luxury', 'SUV - Premium Large', 'CUV - Premium', 'SUV - Upper Mid Range'
    then set VEHCLASS = 0.1891
If VEHCLASS = 'SUV - Lower Mid Range', 'SUV - Mid Range', 'Van - Full Sized', 'Mid Range Car - Premium', 'Sport Car - Premium', 'SUV - Entry Level', 'CUV - Entry Level'
    then set VEHCLASS = 0.0594
If VEHCLASS = 'Pickup - Small', 'Sport Wagon - Entry Level', 'Traditional Car', 'Van - Mini', 'Mid Range Car - Standard'
    then set VEHCLASS = −0.1203
If VEHCLASS = 'Upscale - Ultra', 'Sport Car - Touring'
    then set VEHCLASS = −0.4122
If VEHCLASS = 'Mid Range Car - Lower', 'Small Car - Economy', 'Small Car - Budget'
    then set VEHCLASS = −0.4490
If VEHCLASS = blank then set VEHCLASS = 0.0594
Creation of SCORE for Vehicles 4 - 5 Years Old:
SCORE = (1.9333 + MSRPRAT + FINMILE + TOTOWN1 + HASSURED + POS1 + NEGB1 + MAKETXT + VEHCLASS)

3. SEGMENT 3: Age 6-8 Years
Select if AGE1=3
Recode and point assignment to MSRPRAT:
If AGE = 6 and MSRPRAT is blank then set MSRPRAT=0.3141
If AGE = 7 and MSRPRAT is blank then set MSRPRAT=0.2565
If AGE = 8 and MSRPRAT is blank then set MSRPRAT=0.2068
Compute MSRPRAT=MSRPRAT*2.3463
Recode and point assignment to FINMILE:
If AGE = 6 and FINMILE is blank then set FINMILE=111724.22
If AGE = 7 and FINMILE is blank then set FINMILE=123938.87
If AGE = 8 and FINMILE is blank then set FINMILE=136387.33
Compute FINMILE=FINMILE* −0.000006
Point assignment to TOTOWN1:
Compute TOTOWN1=TOTOWN1 * −0.1569
Recode and point assignment to HASSURED:
If HASSURED equals 'Y' then set HASSURED = 0.2865
Else set HASSURED equal to −0.2865
Create and point assignment to POS1:
Count LEASE = LEASE01 to LEASE10 ('Y')
Count EMISSION = ECHEK01 to ECHEK30 ('3030')
Recode LEASE EMISSION (1 thru hi=1)
If LEASE or EMISSION equals 1 then set then set POS1 = 0.1051
Else set POS1 = −0.1051
Create and point assignment to NEGC1:
Count ACCIDENT=ECHEK01 to ECHEK30 ('3000')
Count THEFT=ECHEK01 to ECHEK30 ('3090')
Count REPOSS=ECHEK01 to ECHEK30 ('5080')
Count TAXI=ECHEK01 to ECHEK30 ('5050')
Recode ACCIDENT THEFT REPOSS TAXI (1 thru hi=1)
If ACCIDENT, THEFT, REPOSS or TAXI equals 1 then set NEGC1 = −0.1652
Else set NEGC1 = 0.1652
Recode and point assignment to MAKETXT:
If MAKETXT = 'Lotus', 'Rolls Royce', 'Porsche', 'Ferrari', 'Hummer', 'Mercedes-Benz', 'Alfa Romeo', 'Jaguar', 'Bentley', 'BMW', 'Mini'
    then set MAKETXT= 0.3857
If MAKETXT = 'Volvo', 'Lexus', 'Land Rover', 'Cadillac', 'GMC', 'Honda', 'Jeep', 'Toyota', 'Scion'
    then set MAKETXT= 0.1595
If MAKETXT = 'Acura', 'Buick', 'Audi', 'Infiniti', 'Isuzu', 'Subaru', 'Lincoln', 'Saab', 'Chevrolet', 'Oldsmobile', 'Nissan', 'Volkswagen'
    then set MAKETXT= −0.0549
If MAKETXT = 'Ford', 'Suzuki', 'Chrysler', 'Saturn', 'Dodge', 'Dodge Freightliner', 'Freightliner', 'Kia', 'Mercury', 'Mazda', 'Pontiac', 'Mitsubishi' or 'Geo'
    then set MAKETXT= −0.1441
If MAKETXT = 'Plymouth', 'Eagle', 'Hyundai'
    then set MAKETXT= −0.3462
If MAKETXT is blank then set MAKETXT = −0.0549
Recode and point assignment to VEHCLASS:
If VEHCLASS is equal 'Sport Car - Ultra Luxury', 'Sport Car - Upper Premium', 'Upscale - Premium', 'SUV - Large', 'SUV - Premium Large', 'CUV - Premium', 'Pickup - Full Sized'
 then set VEHCLASS = 0.3360
If VEHCLASS is equal 'Upscale - Luxury', 'SUV - Lower Mid Range', 'CUV - Mid Range', 'Upscale - Near Luxury', 'Van - Full Sized', 'SUV - Entry Level', 'CUV - Entry Level'
 then set VEHCLASS = 0.1652
If VEHCLASS = 'Mid Range Car - Premium', 'Pickup - Small', 'Traditional Car', 'SUV - Upper Mid Range', 'Mid Range Car - Standard', 'Sport Car - Premium'
 then set VEHCLASS = −0.0474
If VEHCLASS = 'Van - Mini', 'Sport Car - Touring'
 then set VEHCLASS = −0.1117
If VEHCLASS = 'Mid Range Car - Lower', 'Small Car - Economy', 'Upscale - Ultra', 'Small Car - Budget'
 then set VEHCLASS = −0.3421
If VEHCLASS = blank then set VEHCLASS = −0.0474
Creation of SCORE for Vehicles 6 - 8 Years Old:
SCORE = (1.4112+MSRPRAT + FINMILE + TOTOWN1 + HASSURED + POS1 + NEGC1 + MAKETXT + VEHCLASS)
4. SEGMENT 4: Age 9-10 Years
Select if AGE1=4
Recode and point assignment to MSRPRAT:
If AGE = 9 and MSRPRAT is blank then set MSRPRAT= 0.1949
If AGE = 10 and MSRPRAT is blank then set MSRPRAT= 0.1749
Compute MSRPRAT=MSRPRAT*2.0448
Recode and point assignment to FINMILE:
If AGE = 9 and FINMILE is blank then set FINMILE = 147029.5
If AGE = 10 and FINMILE is blank then set FINMILE = 157867.1
Compute FINMILE=FINMILE* −0.000004
Point assignment to TOTOWN1:
Compute TOTOWN1=TOTOWN1 * −0.1717
Recode and point assignment to HASSURED:
If HASSURED equals 'Y' then set HASSURED = 0.3086
Else set HASSURED equal to −0.3086
Create and point assignment to POS1:
Count LEASE = LEASE01 to LEASE10 ('Y')
Count EMISSION = ECHEK01 to ECHEK30 ('3030')
Recode LEASE EMISSION (1 thru hi=1)
If LEASE or EMISSION equals 1 then set then set POS1 = 0.1495
Else set POS1 = −0.1495
Create and point assignment to NEGD1:
Count ACCIDENT=ECHEK01 to ECHEK30 ('3000')
Count THEFT=ECHEK01 to ECHEK30 ('3090')
Count REPOSS=ECHEK01 to ECHEK30 ('5080')
Count TAXI=ECHEK01 to ECHEK30 ('5050')
Recode ACCIDENT THEFT REPOSS TAXI (1 thru hi=1)
If ACCIDENT, THEFT, REPOSS or TAXI equals 1 then set NEGD1 = −0.1971
Else set NEGD1 = 0.1971
Create and point assignment to NEGD2:
Count POLICE=ECHEK01 to ECHEK30 ('5040')
Count GOVUSE=ECHEK01 to ECHEK30 ('5030')
Count LIVERY=ECHEK01 to ECHEK30 ('5020')
Recode POLICE GOVUSE LIVERY (1 thru hi=1)
If POLICE, GOVUSE or LIVERY equals 1 then set NEGD1 = −0.3911
Else set NEGD1 = 0.3911
Recode and point assignment to MAKETXT:
If MAKETXT = 'Aston Martin', 'Ferrari', 'Hummer', 'Lamborghini', 'Rolls Royce', 'Porsche', 'Mercedes-Benz', 'Bentley', 'Lexus', 'BMW', 'Mini'
 then set MAKETXT = 0.6189
If MAKETXT = 'Volvo', 'Jeep', 'Lotus', 'Jaguar', 'Acura', 'Honda', 'Alfa Romeo', 'Toyota', 'Scion', 'T.C.'
 then set MAKETXT = 0.3908
If MAKETXT = 'Land Rover', 'Cadillac', 'GMC', 'Infiniti', 'Buick'
 then set MAKETXT = 0.0264
If MAKETXT = 'Audi', 'Saab', 'Suzuki', 'Lincoln', 'Nissan', 'Chevrolet', 'Mazda', 'Subaru', 'Chrysler', 'Oldsmobile', 'Isuzu', 'Daihatsu', 'Ford', 'Dodge', 'Dodge Freightliner', 'Freightliner', 'Saturn', 'Volkswagen'
 then set MAKETXT = −0.2242
If MAKETXT = 'Mercury', 'Mitsubishi', 'Peugeot'
 then set MAKETXT = −0.3677
If MAKETXT = 'Pontiac', 'Geo', 'Plymouth', 'Eagle', 'Hyundai', 'Sterling', 'Yugo'
 then set MAKETXT = −0.4442
If MAKETXT is blank then set MAKETXT = 0.0264
Recode and point assignment to VEHCLASS:
If VEHCLASS = 'Upscale - Ultra', 'Sport Car - Ultra Luxury', 'Sport Car - Upper Premium', 'SUV - Premium Large', 'CUV - Premium', 'SUV - Large', 'Pickup - Full Sized', 'Upscale - Premium'
 then set VEHCLASS = 0.4292
If VEHCLASS = 'Upscale - Near Luxury', 'Upscale - Luxury', 'SUV - Entry Level',

```
    'CUV - Entry Level'
        then set VEHCLASS = 0.2013
    If VEHCLASS = 'SUV - Upper Mid Range', 'Van - Full Sized', 'SUV - Lower Mid
    Range', 'CUV - Mid Range', 'Sport Car - Premium'
        then set VEHCLASS = 0.0728
    If VEHCLASS = 'Mid Range Car - Premium', 'Traditional Car', 'Pickup - Small'
        then set VEHCLASS = -0.0625
    If VEHCLASS = 'Mid Range Car - Standard', 'Sport Car - Touring'
        then set VEHCLASS = -0.1860
    If VEHCLASS = 'Van - Mini', 'Mid Range Car - Lower', 'Small Car - Economy', 'Small
    Car - Budget'
        then set VEHCLASS = -0.4548
    If VEHCLASS = blank then set VEHCLASS = 0.0728
    Creation of SCORE for Vehicles 9 - 10 Years Old:
    SCORE = (0.6321 + MSRPRAT + FINMILE + TOTOWN1 + HASSURED +
    POS1 + NEGD1 + NEGD2 + MAKETXT + VEHCLASS)
5.  SEGMENT 5: Age 11-12 Years
    Select if AGE1=5
    Recode and point assignment to MSRPRAT:
    If AGE = 11 and MSRPRAT is blank then set MSRPRAT= 0.1446
    If AGE = 12 and MSRPRAT is blank then set MSRPRAT= 0.1248
    Compute MSRPRAT=MSRPRAT*3.7191
    Recode and point assignment to FINMILE:
    If AGE = 11 and FINMILE is blank then set FINMILE = 169523.67
    If AGE = 12 and FINMILE is blank then set FINMILE = 179620.44
    Compute FINMILE=FINMILE* -0.000003
    Point assignment to TOTOWN1:
    Compute TOTOWN1=TOTOWN1 * -0.3131
    Recode and point assignment to HASSURED:
    If HASSURED equals 'Y' then set HASSURED = 0.2076
    Else set HASSURED equal to -0.2076
    Create and point assignment to POS1:
    Count LEASE = LEASE01 to LEASE10 ('Y')
    Count EMISSION = ECHEK01 to ECHEK30 ('3030')
    Recode LEASE EMISSION (1 thru hi=1)
    If LEASE or EMISSION equals 1 then set then set POS1 = 0.2573
    Else set POS1 = -0.2573
    Create and point assignment to NEGE1:
    Count ACCIDENT=ECHEK01 to ECHEK30 ('3000')
    Count THEFT=ECHEK01 to ECHEK30 ('3090')
    Count REPOSS=ECHEK01 to ECHEK30 ('5080')
    Count TAXI=ECHEK01 to ECHEK30 ('5050')
    Recode ACCIDENT THEFT REPOSS TAXI (1 thru hi=1)
    If ACCIDENT, THEFT, REPOSS or TAXI equals 1 then set NEGE1 = -0.2057
    Else set NEGE1 = 0.2057
    Recode and point assignment to MAKETXT:
    If MAKETXT = 'Ferrari', 'Lamborghini', 'Lotus', 'Rolls Royce', 'Alfa Romeo', 'Bentley',
    'Porsche', 'Mercedes-Benz', 'Lexus', 'BMW', 'Mini', 'Laforza', 'Jaguar', 'Land Rover',
    'Volvo', 'Jeep'
        then set MAKETXT = 0.6174
    If MAKETXT = 'GMC', 'Infiniti', 'Toyota', 'Scion', 'Acura'
        then set MAKETXT = 0.1136
    If MAKETXT = 'Honda', 'Cadillac', 'Sterling' 'Isuzu', 'Daihatsu', 'Mazda', 'Chevrolet',
    'Buick', 'Ford', 'Nissan' 'Lincoln', 'Volkswagen', 'Oldsmobile', 'Suzuki', 'Audi', 'T.C. ',
    'Saab', 'Avanti'
        then set MAKETXT = -0.0944
    If MAKETXT = 'Mitsubishi', 'Dodge', 'Dodge Freightliner', 'Freightliner', 'Chrysler',
    'Geo', 'Subaru'
        then set MAKETXT = -0.1559
    If MAKETXT = 'Mercury', 'Peugeot', 'Pontiac', 'Plymouth', 'Hyundai', 'Merkur', 'Eagle',
    'AMC', 'Yugo', 'GMC Canada'
        then set MAKETXT = -0.4807
    If MAKETXT is blank then set MAKETXT = -0.0944
    Recode and point assignment to VEHCLASS:
    If VEHCLASS = 'Sport Car - Ultra Luxury', 'Upscale - Ultra', 'SUV - Premium Large',
    ' CUV - Premium', 'Upscale - Premium', 'Sport Car - Upper Premium', 'Pickup - Full
    Sized', 'SUV - Lower Mid Range', 'CUV - Mid Range', 'SUV - Large'
        then set VEHCLASS = 0.3976
    If VEHCLASS = 'SUV - Entry Level', 'CUV - Entry Level', 'Upscale - Luxury', 'Van -
    Full Sized', 'Pickup - Small', 'Sport Car - Premium', 'Upscale - Near Luxury'
        then set VEHCLASS = 0.1455
    If VEHCLASS = 'Traditional Car', 'Mid Range Car - Premium', 'Sport Car - Touring'
        then set VEHCLASS = 0.0066
    If VEHCLASS = 'Mid Range Car - Standard', 'Van - Mini'
        then set VEHCLASS = -0.1662
    If VEHCLASS = 'Mid Range Car - Lower', 'Small Car - Budget', 'Small Car -
    Economy', 'Sport Wagon - Entry Level'
        then set VEHCLASS = -0.3835
    If VEHCLASS = blank then set VEHCLASS = 0.0066
```

Creation of SCORE for Vehicles 11-12 Years Old:
SCORE = (0.5500 + MSRPRAT + FINMILE + TOTOWN1 + HASSURED + POS1 + NEGE1 + MAKETXT + VEHCLASS)

6. SEGMENT 6: Age 13+ Years
Select if AGE1=6
Recode and point assignment to MSRPRAT:
If AGE = 13 and MSRPRAT is blank then set MSRPRAT= 0.1024
If AGE = 14 and MSRPRAT is blank then set MSRPRAT= 0.0884
If AGE = 15 and MSRPRAT is blank then set MSRPRAT= 0.0727
If AGE >= 16 and MSRPRAT is blank then set MSRPRAT= 0.0001
Compute MSRPRAT=MSRPRAT*3.7223
Recode and point assignment to FINMILE:
If AGE = 13 and FINMILE is blank then set FINMILE = 188582.78
If AGE = 14 and FINMILE is blank then set FINMILE = 194064.37
If AGE = 15 and FINMILE is blank then set FINMILE = 200533.11
If AGE = 16 and FINMILE is blank then set FINMILE = 208003.40
If AGE = 17 and FINMILE is blank then set FINMILE = 213229.71
If AGE = 18 and FINMILE is blank then set FINMILE = 212545.77
If AGE = 19 and FINMILE is blank then set FINMILE = 222148.95
If AGE >= 20 and FINMILE is blank then set FINMILE = 221612.97
Compute FINMILE=FINMILE* −0.000001
Point assignment to TOTOWN1:
Compute TOTOWN1=TOTOWN1 * −0.3849
Recode and point assignment to HASSURED:
If HASSURED equals 'Y' then set HASSURED = 0.2198
Else set HASSURED equal to −0.2198
Create and point assignment to POS1:
Count LEASE = LEASE01 to LEASE10 ('Y')
Count EMISSION = ECHEK01 to ECHEK30 ('3030')
Recode LEASE EMISSION (1 thru hi=1)
If LEASE or EMISSION equals 1 then set then set POS1 = 0.2261
Else set POS1 = −0.2261
Create and point assignment to ACCIDENT
Count ACCIDENT=ECHEK01 to ECHEK30 ('3000')
Recode ACCIDENT (1 thru hi=1)
If ACCIDENT = 1 then set ACCIDENT = −0.2545
Else set ACCIDENT= 0.2545
Recode and point assignment to MAKETXT:
If MAKETXT = 'Lamborghini', 'Saturn', 'Ferrari', 'Lotus', 'Rolls Royce', 'Land Rover', 'Porsche', 'Suzuki', 'Mercedes-Benz', 'Alfa Romeo', 'Avanti', 'Bentley', 'Triumph', 'TVR', 'Mitsubishi', 'BMW', 'Mini', 'Jaguar', 'Aston Martin'
    then set MAKETXT = 0.4430
If MAKETXT = 'DeLorean', 'Jeep', 'Fiat', 'GMC', 'Bertone', 'Toyota', 'Scion', 'Lexus', 'Acura', 'Hyundai', 'Volvo'
    then set MAKETXT = 0.2180
If MAKETXT = 'Maserati', 'Isuzu', 'Mazda'
    then set MAKETXT = 0.0573
If MAKETXT = 'Chevrolet', 'Ford', 'Nissan', 'Honda'
    then set MAKETXT = −0.0464
If MAKETXT = 'Volkswagen', 'Sterling', 'Merkur', 'Cadillac', 'Dodge', 'Dodge Freightliner', 'Freightliner',
    then set MAKETXT = −0.1173
If MAKETXT = 'Lincoln', 'Peugeot', 'Oldsmobile', 'Buick', 'Saab', 'Subaru', 'Chrysler'
    then set MAKETXT = −0.2106
If MAKETXT = 'Mercury', 'Audi', 'Pontiac', 'Eagle', 'Plymouth', 'AMC', 'Renault', 'Geo', 'GMC Canada', 'Lancia', 'Daihatsu', 'Yugo'
    then set MAKETXT = −0.3440
If MAKETXT is blank then set MAKETXT = 0.0573
Recode and point assignment to VEHCLASS:
If VEHCLASS = 'Upscale - Ultra', 'SUV - Premium Large', 'CUV - Premium', 'Sport Car - Upper Premium', 'Upscale - Premium', 'Sport Car - Ultra Luxury', 'Pickup - Full sized', 'SUV - Lower Mid Range', 'CUV - Mid Range', 'Sport Car - Premium', 'Pickup - Small', 'SUV - Large', 'SUV - Entry Level', CUV - Entry Level'
    then set VEHCLASS = 0.4218
If VEHCLASS = 'Van - Full Sized', 'Upscale - Luxury'
    then set VEHCLASS = 0.2526
If VEHCLASS = 'Sport Car - Touring', 'Small Car - Budget', 'Upscale - Near Luxury', 'Mid Range Car - Premium'
    then set VEHCLASS = −0.0788
If VEHCLASS = 'Mid Range Car - Standard', 'Traditional Car', 'Van - Mini', 'Small Car - Economy'
    then set VEHCLASS = −0.2137
If VEHCLASS = 'Mid Range Car - Lower', 'Sport Wagon - Entry Level'
    then set VEHCLASS = −0.3819
If VEHCLASS = blank then set VEHCLASS = −0.0788
Creation of SCORE for Vehicles 13+ Years Old:
SCORE = (0.0171 + MSRPRAT + FINMILE + TOTOWN1 + HASSURED + POS1 + ACCIDENT + MAKETXT + VEHCLASS)

As shown in the above representative embodiment, the estimated/actual mileage and other factors receive a weighting based on the statistical analysis of a sample set. In the detailed example described here, for the first age class, the number of owners is factored at a weight of −0.0894. If a vehicle is AutoCheck assured, then it gets a 0.4319 factor value; alternatively it gets a −0.4319 factor value. If there has been any record of government or police use, or an accident or theft reported for the vehicle, another factor (NEGA1) is given a value of −0.4216 and, if not, a value of 0.4216. Next, different makes of cars are assigned various factor values (MAKETXT). Typically high-end and well-made cars obtain greater values, while more budget cars may receive lesser values. A similar determination of the vehicle class is also a factor (VEHCLASS). To generate a score, the previously determined factors are then summed with 1.7137. This score will be a number between 0.0 and 1.00, inclusive. This may represent a probability of the vehicle being on the road in five more years. In an embodiment, the score reported to the end user may be multiplied by 100 to give a more recognizable score, such as a percentage. A similar process is used with the other age classes, although the weightings are different as can be seen.

Sample Uses

Although providing a vehicle score according to the present disclosure is useful in and of itself, there are a number of additional uses that may be helpful to users, whether they be vehicle owners, insurance companies, dealerships, and the like. First, it may be helpful to provide an embodiment to plot a vehicle's score over time. For example, data from the first year of the vehicle's life may be used to find a score as of a year from its original sale. Similarly data from the first and second years could be used to determine a score at the end of the second year, and so on. This data may be plotted on a chart or graph to show the decline in score over time. If restoration or repair work is done and factored into the score, such a score may also increase. Graphing multiple scores may also show the effect of various owners on a vehicle's score, if the timing of ownership is plotted as well.

Additionally, in one embodiment, it is possible to project a score into the future, such as by estimating mileage and likely events in future months and/or assuming similar trending in usage and event history as in a previous time frame. This can help show a vehicle owner when his or her car should best be replaced, the length of time it is likely to last, or other useful information. In another embodiment, such score predicting considers different possible usage and event scenarios (e.g., conservative, moderate, and heavy usage) to predict a range of future scoring. As predictions go farther into the future, the possible score estimations are likely to expand into a general cone shape from the present calculated score. This can help show users best-, worst-, and likely-case scenarios.

Furthermore, in one embodiment, a score may be used as a factor in providing individualized valuations for used cars. This can be particularly useful to user car dealers or interactive websites, such as Kelley Blue Book online (www.kbb.com).

Alternatives

One embodiment of the system and method described herein provides a score generator system that generates an automated vehicle specific valuation of a used car based on the physical and historical attributes of that vehicle. This score may indicate the likelihood that the vehicle will be on the road in a specific period of time. The score may give an absolute percentage of such likelihood or it may give a value relative to all other used vehicles in a database, all other used vehicles of the same make/model/year, or a certain subset of the vehicles in a database. In one embodiment, the score generator system includes a data link module for linking vehicle data and filter module for applying a multi-level filters that process the linked vehicle data.

Although the foregoing has been described in terms of certain preferred embodiments, other embodiments will be apparent to those of ordinary skill in the art from the disclosure herein. For example, a vehicle score may indicate the likelihood of a vehicle being on the road for another X number of months or years. Although X was discussed as five years in an example above, it would be obvious to vary this between three and eight years or any other period desired. Similarly, scoring may be based on a car holding up for another Y miles, where Y may be, for example, 36,000 miles, 50,000 miles, or 100,000 miles. The scoring discussed above has also been referred to as numerical, but a score could be configured as, for example, a set of stars or a grade, such as the A to F scale typical on elementary school report cards; pluses and minuses may be included to provide more precise grading as well. Additional elements may include actual wholesale or retail prices, or the actual "popularity" of the vehicle make/model/year combination. Different markets that are served or might be served may get different representations of the same information, or have the information presented in different ways.

The present systems and methods may also be accessed by any of a number of means, such as through the Internet as already explained or computer to computer transfer, through interactive television services, stand-alone or networked kiosks, automated telephone services and the like. Scores may be generated or retrieved individually or in batch in various embodiments. Although much of this disclosure discusses individual user access, it is understood that lenders, dealers, auctioneers, and others involved or interested in vehicles, particularly the used vehicle market, may also utilize this system. Moreover, the described embodiments have been presented by way of example only, and are not intended to limit the scope of the disclosure. Indeed, the novel systems and methods described herein may be embodied in a variety of other forms without departing from the spirit thereof. Accordingly, other combinations, omissions, substitutions, and modifications will be apparent to the skilled artisan in view of the disclosure herein. Thus, the present disclosure is not limited by the preferred embodiments, but is defined by reference to the appended claims. The accompanying claims and their equivalents are intended to cover forms or modifications as would fall within the scope and spirit of the disclosure.

What is claimed is:

1. A vehicle scoring system comprising:
a network interface configured to provide remote access to the vehicle scoring system by a user;
a processor configured to execute a set of instructions;
a first memory storing the set of instructions, the set of instructions including instructions to:
provide an interface for operation by the user at a remote computing device, and
receive an electronic request, via the interface and from the user via the remote computing device, regarding a score of a vehicle to be provided in real-time, the request including identifier data including at least one of a vehicle identification number (VIN) of the vehicle, a license plate data of the vehicle, or other identifier data of the vehicle;

a decoder module electronically accessible by the processor, the decoder module configured to:
parse the electronic request to dynamically identify a set of request attribute data related to factors of the vehicle, wherein a subset of the set of request attribute data includes request classification attribute data;
a data storage module, electronically accessible by the processor, the data storage module configured to:
use the identifier data or data from the set of request attribute data as a request identifier to select a rule set from a set of rules, the set of rules comprising: (a) a first set of rules for linking the request identifier with stored records using the first set of rules, and (b) a second set of rules for linking the request identifier with stored records using the second set of rules, where the first set of rules is different from the second set of rules;
use the selected rule set to link the request identifier with data corresponding to one or more of a plurality of vehicles from at least one of a third party information database, an industry publication database, a safety ratings database, or a vehicle specification database, the plurality of vehicles including the vehicle; and
store the linked data according to one or more unique identifiers;
a precompilation module configured to:
identify a target precompiled hypothetical vehicle data record associated with the request identifier selected from a plurality of precompiled hypothetical vehicle data records and stored in a second memory, wherein the target precompiled hypothetical vehicle data record includes a plurality of data fields, wherein each data field stores data corresponding to a feature of the hypothetical vehicle data record and wherein the plurality of precompiled hypothetical vehicle data records includes precompiled hypothetical vehicle data records corresponding to a plurality of vehicles;
a filter module executed by the vehicle scoring system and configured to:
select one or more preset filters to filter the linked data;
automatically adjust the one or more preset filters, based on the linked data, to identify extraneous data sets that are irrelevant to the linked data to eliminate the extraneous data sets from additional processing;
filter the linked data using the selected, adjusted one or more preset filters to limit extraneous data from the linked data; and
assign a plurality of values to a plurality of the factors for the vehicle within the linked data using the target precompiled hypothetical vehicle data records,
a clock system indicating current date information;
a modeling module executed by the vehicle scoring system and configured to:
access the clock system to determine current date information associated with the electronic request;
select one or more models configured to indicate likelihood that a vehicle will remain on the road in a specific period of time and to determine weights for the assigned plurality of values that correspond to a selection of a subset of the plurality of factors for the vehicle for use in scoring the vehicle; and
generate a vehicle score based on the one or more selected models, and using one or more of the plurality of values, the determined weights, and the selection of the subset of the plurality of factors, wherein the vehicle score corresponds to a total value independent of or dependent on total values of each of a plurality of other vehicles or provides a total ranking independent of or dependent on total rankings of each of the plurality of other vehicles; and
an output module configured to:
generate a standardized graphic view that simplifies a comparison of the vehicle with one or more of the plurality of vehicles, the graphic view comprising a secure, electronic score tile including an uneditable representation of the vehicle score and a range of scores for the one or more of the plurality of vehicles; and
automatically generate and transmit to the remote computing device an electronic data packet configured to cause generation of a user interface that displays:
(A) an output box displaying at least a predefined subset of the plurality of factors and corresponding relative risk and assigned values as generated by the filter module and the modeling module, and
(B) the score tile, including:
(1) a numerical value representing the vehicle score and a numerical range having a high threshold and a low threshold, the numerical range representing the range of scores and the vehicle score indicative of a total score or ranking of the vehicle based on the plurality of factors and
(2) an additional indicator based on the vehicle score, wherein the vehicle score falls within the range of scores, and wherein the vehicle score of the score tile is updated each time the score tile is rendered.

2. The vehicle scoring system of claim 1, wherein the factors include a first factor and a second factor, and wherein a first relative importance value of the first factor is higher than a second relative importance value of the second factor.

3. The vehicle scoring system of claim 1, wherein the additional indicator of the vehicle score is a letter grade selected from a preselected range.

4. The vehicle scoring system of claim 1, wherein the output module comprises a web server.

5. The vehicle scoring system of claim 1, wherein the data storage module comprises a plurality of databases.

6. The vehicle scoring system of claim 1, wherein the modeling module uses at least a portion of the linked data to determine what types of data to use for determining the vehicle score.

7. The vehicle scoring system of claim 1, wherein the modeling module uses at least a portion of the linked data to determine relative values of different types of data to use for determining the vehicle score.

8. The vehicle scoring system of claim 1, wherein the indication of the vehicle score is a point grade where the high threshold is 999 and the low threshold is 100.

9. A method of scoring a vehicle, the method comprising:
providing an interface, via a processor, for operation by a user at a remote computing device over a network accessed by a network interface;
receiving an electronic request, via the interface, from the user via the remote computing device regarding a score of a vehicle to be provided in real-time, the request including identifier data including at least one of a vehicle identification number (VIN) of the vehicle, a license plate data of the vehicle, or other identifier data of the vehicle;

parsing the electronic request to dynamically identify a set of request attribute data related to factors of the vehicle, wherein a subset of the set of request attribute data includes request classification attribute data;

using the identifier data or data from the set of request attribute data as a request identifier to select a rule set from a set of rules, the set of rules comprising: (a) a first set of rules for linking the request identifier with stored records using the first set of rules, and (b) a second set of rules for linking the request identifier with stored records using the second set of rules, where the first set of rules is different from the second set of rules;

using the selected rule set to link the request identifier with data corresponding to one or more of a plurality of vehicles from at least one of a third party information database, an industry publication database, a safety ratings database, or a vehicle specification database, the plurality of vehicles including the vehicle;

storing the linked data according to one or more unique identifiers;

identifying a target precompiled hypothetical vehicle data record associated with the request identifier selected from a plurality of precompiled hypothetical vehicle data records and stored in a memory, wherein the target precompiled hypothetical vehicle data record includes a plurality of data fields, wherein each data field stores data corresponding to a feature of the hypothetical vehicle data record and wherein the plurality of precompiled hypothetical vehicle data records includes precompiled hypothetical vehicle data records corresponding to a plurality of vehicles;

selecting one or more preset filters to filter the linked data;

automatically adjusting the one or more preset filters, based on the linked data, to identify extraneous data sets that are irrelevant to the linked data to eliminate the extraneous data sets from additional processing;

filtering, via a filter module, the linked data using the selected, adjusted one or more preset filters to limit extraneous data from the linked data;

assigning a plurality of values to a plurality of the factors for the vehicle within the linked data using the target precompiled hypothetical vehicle data records, accessing a clock system to determine current date information associated with the electronic request;

selecting one or more models configured to indicate likelihood that a vehicle will remain on the road in a specific period of time and to determine weights for the assigned plurality of values that correspond to a selection of a subset of the plurality of factors for the vehicle for use in scoring the vehicle;

generating a vehicle score based on the one or more selected models, and using one or more of the plurality of values, the determined weights, and the selection of the subset of the plurality of factors, wherein the vehicle score corresponds to a total value independent of or dependent on total values of each of a plurality of other vehicles or provides a total ranking independent of or dependent on total rankings of each of the plurality of other vehicles;

generating a standardized graphic view that simplifies a comparison of the vehicle with one or more of the plurality of vehicles, the graphic view comprising a secure, electronic score tile including an uneditable representation of the vehicle score and a range of scores for the one or more of the plurality of vehicles; and automatically generating and transmitting to the remote computing device an electronic data packet configured to cause generation of a user interface that displays:
(A) an output box displaying at least a predefined subset of the plurality of factors and corresponding relative risk and assigned values as generated by the filter module and the modeling module, and
(B) the score tile, including:
(1) a numerical value representing the vehicle score and a numerical range having a high threshold and a low threshold, the numerical range representing the range of scores and the vehicle score indicative of a total score or ranking of the vehicle based on the plurality of factors and
(2) an additional indicator based on the vehicle score, wherein the vehicle score falls within the range of scores, and wherein the vehicle score of the score tile is updated each time the score tile is rendered.

10. The method of claim 9, wherein the factors include a first factor and a second factor, and wherein a first relative importance value of the first factor is higher than a second relative importance value of the second factor.

11. The method of claim 9, wherein the additional indicator of the vehicle score is a letter grade selected from a preselected range.

12. The method of claim 9, further comprising determining what types of data are used for determining the vehicle score based on at least a portion of the linked data.

13. The method of claim 9, wherein the indication of the vehicle score is a point grade where the high threshold is 999 and the low threshold is 100.

14. A non-transitory computer-readable medium comprising instructions configured to cause one or more computer processors to perform operations comprising:

providing an interface for operation by a user at a remote computing device over a network accessed by a network interface;

receiving an electronic request, via the interface, from the user via the remote computing device regarding a score of a vehicle to be provided in real-time, the request including identifier data including at least one of a vehicle identification number (VIN) of the vehicle, a license plate data of the vehicle, or other identifier data of the vehicle;

parsing the electronic request to dynamically identify a set of request attribute data related to factors of the vehicle, wherein a subset of the set of request attribute data includes request classification attribute data;

using the identifier data or data from the set of request attribute data as a request identifier to select a rule set from a set of rules, the set of rules comprising: (a) a first set of rules for linking the request identifier with stored records using the first set of rules, and (b) a second set of rules for linking the request identifier with stored records using the second set of rules, where the first set of rules is different from the second set of rules;

using the selected rule set to link the request identifier with data corresponding to one or more of a plurality of vehicles from at least one of a third party information database, an industry publication database, a safety ratings database, or a vehicle specification database, the plurality of vehicles including the vehicle;

storing the linked data according to one or more unique identifiers for the plurality of vehicles;

identifying a target precompiled hypothetical vehicle data record associated with the request identifier selected from a plurality of precompiled hypothetical vehicle data records and stored in a memory, wherein the target precompiled hypothetical vehicle data record includes a plurality of data fields, wherein each data field stores data corresponding to a feature of the hypothetical vehicle data record and wherein the plurality of precompiled hypothetical vehicle data records includes precompiled hypothetical vehicle data records corresponding to a plurality of vehicles;

selecting one or more preset filters to filter the linked data;

automatically adjusting the one or more preset filters, based on the linked data, to identify extraneous data sets that are irrelevant to the linked data to eliminate the extraneous data sets from additional processing;

filtering, via a filter module, the linked data using the selected, adjusted one or more preset filters to limit extraneous data from the linked data;

assigning a plurality of values to a plurality of the factors for the vehicle within the linked data using the target precompiled hypothetical vehicle data records, accessing a clock system to determine current date information associated with the electronic request;

selecting one or more models configured to indicate likelihood that a vehicle will be on the road in a specific period of time and to determine weights for the assigned plurality of values that correspond to a selection of a subset of the plurality of factors for the vehicle for use in scoring the vehicle;

generating a vehicle score based on the one or more selected models, and using one or more of the plurality of values, the determined weights, and the selection of the subset of the plurality of factors, wherein the vehicle score corresponds to a total value independent of or dependent on total values of each of a plurality of other vehicles or provides a total ranking independent of or dependent on total rankings of each of the plurality of other vehicles;

generating a standardized graphic view that simplifies a comparison of the vehicle with one or more of the plurality of vehicles, the graphic view comprising a secure, electronic score tile including an uneditable representation of the vehicle score and a range of scores for the one or more of the plurality of vehicles;

automatically generating and transmitting to the remote computing device an electronic data packet configured to cause generation of a user interface that displays:

(A) an output box displaying at least a predefined subset of the plurality of factors and corresponding relative risk and assigned values as generated by the filter module and the modeling module, and (B) the score tile, including:

(1) a numerical value representing the vehicle score and a numerical range having a high threshold and a low threshold, the numerical range representing the range of scores and the vehicle score indicative of a total score or ranking of the vehicle based on the plurality of factors and (2) an additional indicator based on the vehicle score, wherein the vehicle score falls within the range of scores, and wherein the vehicle score of the score tile is updated each time the score tile is rendered.

15. The non-transitory computer-readable medium of claim 14, wherein the factors include a first factor and a second factor, and wherein a first relative importance value of the first factor is higher than a second relative importance value of the second factor.

16. The non-transitory computer-readable medium of claim 14, wherein the additional indicator of the vehicle score is a letter grade selected from a preselected range.

17. The non-transitory computer-readable medium of claim 14, wherein the operations further comprise determining relative values of different types of data used to determine the vehicle score based on at least a portion of the linked data.

18. The non-transitory computer-readable medium of claim 14, wherein the indication of the vehicle score is a point grade where the high threshold is 999 and the low threshold is 100.

* * * * *